US012475213B2

(12) United States Patent
Osipov et al.

(10) Patent No.: US 12,475,213 B2
(45) Date of Patent: *Nov. 18, 2025

(54) VISUAL INDICATOR OF APPLICATION OF SECURITY POLICY

(71) Applicant: Venn Technology Corporation, New York, NY (US)

(72) Inventors: Aleksandr Osipov, Tarrytown, NY (US); Jacob Kazakevich, Manalapan, NJ (US); David Matalon, Great Neck, NY (US); Alexander Chermyanin, Antalya (TR); Aleksandr Sedunov, Antalya (TR)

(73) Assignee: Venn Technology Corporation, New York, NY (US)

( * ) Notice: Subject to any disclaimer, the term of this patent is extended or adjusted under 35 U.S.C. 154(b) by 301 days.

This patent is subject to a terminal disclaimer.

(21) Appl. No.: 17/891,357

(22) Filed: Aug. 19, 2022

(65) Prior Publication Data

US 2023/0059726 A1    Feb. 23, 2023

Related U.S. Application Data

(60) Provisional application No. 63/260,408, filed on Aug. 19, 2021.

(51) Int. Cl.
*G06F 21/53* (2013.01)
*G06F 9/54* (2006.01)
(Continued)

(52) U.S. Cl.
CPC .............. *G06F 21/53* (2013.01); *G06F 9/547* (2013.01); *G06F 21/16* (2013.01); *G06F 21/316* (2013.01);
(Continued)

(58) Field of Classification Search
CPC ........ G06F 21/53; G06F 21/16; G06F 21/316; G06F 21/577; G06F 21/1063;
(Continued)

(56) References Cited

U.S. PATENT DOCUMENTS

| 5,870,543 A | 2/1999 | Ronning |
| 5,874,958 A | 2/1999 | Ludolph |

(Continued)

FOREIGN PATENT DOCUMENTS

| CN | 101513008 B | 9/2012 |
| CN | 103299658 A | 9/2013 |

(Continued)

OTHER PUBLICATIONS

Towards Resource-aware Business Process development in the Cloud, Hachicha et al, Apr. 2015 (Year: 2015).

(Continued)

*Primary Examiner* — Pramila Parthasarathy
(74) *Attorney, Agent, or Firm* — Young Basile Hanlon & MacFarlane, P.C.

(57) ABSTRACT

A computer stores, within a single user account, multiple supervised computing resources and multiple additional computing resources. The multiple supervised computing resources are associated with a security policy. The computer executes a first instance of a specified application that lacks read access and lacks write access to any and all of the multiple supervised computing resources. The computer executes, simultaneously with the first instance, a second instance of the specified application that accesses at least a portion of the multiple supervised computing resources. The computer applies rules from the security policy to the second instance of the specified application while foregoing applying the rules from the security policy to the first instance of the specified application.

23 Claims, 15 Drawing Sheets

(51) Int. Cl.
*G06F 21/16* (2013.01)
*G06F 21/31* (2013.01)
*G06F 21/57* (2013.01)
*H04L 9/40* (2022.01)
*G06F 21/10* (2013.01)

(52) U.S. Cl.
CPC ............ *G06F 21/577* (2013.01); *H04L 63/10* (2013.01); *H04L 63/102* (2013.01); *H04L 63/105* (2013.01); *H04L 63/20* (2013.01); *H04L 63/205* (2013.01); *G06F 21/1063* (2023.08); *G06F 2221/033* (2013.01); *G06F 2221/2149* (2013.01)

(58) Field of Classification Search
CPC ....... G06F 2221/033; G06F 2221/2149; G06F 9/547; H04L 63/10; H04L 63/101; H04L 63/102; H04L 63/105; H04L 63/20; H04L 63/205
See application file for complete search history.

(56) References Cited

U.S. PATENT DOCUMENTS

| | | | |
|---|---|---|---|
| 6,658,571 | B1 | 12/2003 | O'Brien et al. |
| 7,162,719 | B2 | 1/2007 | Schmidt |
| 7,779,247 | B2 | 8/2010 | Roegner |
| 7,926,086 | B1 | 4/2011 | Violleau et al. |
| 7,930,273 | B1 | 4/2011 | Clark et al. |
| 8,255,280 | B1 | 8/2012 | Kay et al. |
| 8,495,731 | B1 | 7/2013 | Mar et al. |
| 9,021,559 | B1 | 4/2015 | Vetter et al. |
| 9,307,451 | B1 | 4/2016 | Kodeswaran et al. |
| 9,461,978 | B2 * | 10/2016 | Mishra .................. H04L 63/105 |
| 9,519,765 | B2 | 12/2016 | Brown et al. |
| 9,646,152 | B2 | 5/2017 | Lam et al. |
| 9,785,341 | B2 | 10/2017 | Stallings et al. |
| 10,044,757 | B2 * | 8/2018 | Qureshi .................. H04W 4/02 |
| 10,152,197 | B1 * | 12/2018 | Xue .......................... G06F 9/453 |
| 10,254,942 | B2 * | 4/2019 | Vranjes ............... G06F 3/04847 |
| 10,630,716 | B1 | 4/2020 | Ghosh et al. |
| 10,657,246 | B2 | 5/2020 | Biswas et al. |
| 11,086,984 | B2 | 8/2021 | Shannon |
| 11,687,644 | B2 | 6/2023 | Osipov et al. |
| 11,704,431 | B2 | 7/2023 | Kraus et al. |
| 11,750,475 | B1 | 9/2023 | Gonzalez et al. |
| 11,902,330 | B1 | 2/2024 | Dods |
| 2002/0178119 | A1 | 11/2002 | Griffin et al. |
| 2004/0162781 | A1 | 8/2004 | Searl et al. |
| 2005/0182750 | A1 | 8/2005 | Krishna et al. |
| 2006/0041405 | A1 | 2/2006 | Chen et al. |
| 2006/0236363 | A1 | 10/2006 | Heard et al. |
| 2007/0033273 | A1 | 2/2007 | White et al. |
| 2007/0094673 | A1 | 4/2007 | Hunt et al. |
| 2007/0186274 | A1 | 8/2007 | Thrysoe et al. |
| 2007/0239987 | A1 | 10/2007 | Hoole et al. |
| 2008/0134071 | A1 * | 6/2008 | Keohane .................. G06F 3/048 715/769 |
| 2009/0177979 | A1 | 7/2009 | Garbow et al. |
| 2009/0187648 | A1 | 7/2009 | Sunkammurali et al. |
| 2009/0328215 | A1 | 12/2009 | Arzi et al. |
| 2010/0122271 | A1 | 5/2010 | Labour et al. |
| 2010/0319053 | A1 | 12/2010 | Gharabally |
| 2011/0113467 | A1 | 5/2011 | Agarwal et al. |
| 2012/0030729 | A1 | 2/2012 | Schwartz et al. |
| 2012/0210333 | A1 * | 8/2012 | Potter .................. G06F 9/4843 719/313 |
| 2012/0233314 | A1 | 9/2012 | Jakobsson |
| 2013/0031549 | A1 | 1/2013 | Osmond |
| 2013/0160141 | A1 | 6/2013 | Tseng et al. |
| 2013/0232238 | A1 * | 9/2013 | Cohn .................. H04W 12/08 709/220 |
| 2013/0291055 | A1 | 10/2013 | Muppidi et al. |
| 2013/0332996 | A1 | 12/2013 | Fiala et al. |
| 2013/0339518 | A1 | 12/2013 | Schimpfky et al. |
| 2014/0007184 | A1 | 1/2014 | Porras |
| 2014/0095894 | A1 | 4/2014 | Barton et al. |
| 2014/0380406 | A1 * | 12/2014 | Saidi .................. H04W 12/35 726/16 |
| 2015/0134735 | A1 * | 5/2015 | Momchilov .............. G06F 9/54 709/203 |
| 2016/0070626 | A1 | 3/2016 | Raghavendra |
| 2016/0099972 | A1 * | 4/2016 | Qureshi .................. H04L 67/10 726/1 |
| 2016/0255139 | A1 | 9/2016 | Rathod |
| 2016/0315967 | A1 * | 10/2016 | Trevathan ............... H04W 8/22 |
| 2017/0041344 | A1 | 2/2017 | Nandakumar et al. |
| 2017/0250919 | A1 | 8/2017 | Kessel et al. |
| 2018/0191766 | A1 | 7/2018 | Holeman et al. |
| 2018/0267696 | A1 | 9/2018 | Peshkar |
| 2018/0341499 | A1 * | 11/2018 | Tse .......................... G06F 9/451 |
| 2019/0199808 | A1 | 6/2019 | Gamache et al. |
| 2020/0036739 | A1 | 1/2020 | Novikov et al. |
| 2020/0059492 | A1 | 2/2020 | Janakiraman et al. |
| 2020/0192867 | A1 | 6/2020 | McBeath |
| 2020/0204576 | A1 | 6/2020 | Davis et al. |
| 2020/0233951 | A1 | 7/2020 | Biswas et al. |
| 2020/0244637 | A1 | 7/2020 | Main et al. |
| 2020/0320454 | A1 * | 10/2020 | Almashor .............. G06Q 10/04 |
| 2020/0356677 | A1 | 11/2020 | Alexander et al. |
| 2021/0051155 | A1 | 2/2021 | Sloane et al. |
| 2022/0179983 | A1 | 6/2022 | Kassa et al. |
| 2022/0215094 | A1 | 7/2022 | Gupta |
| 2022/0269782 | A1 | 8/2022 | Chang et al. |
| 2022/0336078 | A1 | 10/2022 | Wise et al. |
| 2022/0365861 | A1 | 11/2022 | DeFilippo et al. |
| 2023/0054350 | A1 | 2/2023 | Osipov et al. |
| 2023/0056056 | A1 | 2/2023 | Osipov et al. |
| 2023/0058203 | A1 | 2/2023 | Osipov et al. |
| 2023/0059726 | A1 | 2/2023 | Osipov et al. |
| 2023/0101145 | A1 | 3/2023 | Osipov et al. |
| 2023/0308474 | A1 | 9/2023 | Thompson |
| 2023/0362651 | A1 | 11/2023 | Lie |
| 2024/0007506 | A1 | 1/2024 | Cage et al. |
| 2024/0184901 | A1 | 6/2024 | Osipov et al. |
| 2024/0187414 | A1 | 6/2024 | Osipov et al. |

FOREIGN PATENT DOCUMENTS

| | | |
|---|---|---|
| CN | 102365554 B | 1/2015 |
| CN | 106790231 A | 5/2017 |
| CN | 110727942 A | 1/2020 |
| EP | 2685750 A1 | 1/2014 |
| EP | 2541402 B1 | 1/2019 |
| KR | 10 2017 0035294 A | 3/2017 |
| WO | 2014113882 A1 | 7/2014 |
| WO | 2017147525 A1 | 8/2017 |

OTHER PUBLICATIONS

Notice of Allowance dated Feb. 7, 2023 for U.S. Appl. No. 17/890,798.
International Search Report and Written Opinion for PCT Patent Application No. PCT/US2022/040928 dated Nov. 29, 2022, 7 pages.
Non-Final Office Action dated Nov. 2, 2022 for U.S. Appl. No. 17/890,798.
Non-Final Office Action dated Nov. 18, 2024 for U.S. Appl. No. 17/890,879, 38 pp.
Non-Final Office Action dated Nov. 14, 2024 for U.S. Appl. No. 17/890,853, 52 pp.
Non-Final Office Action dated Sep. 11, 2024 for U.S. Appl. No. 17/891,392.
Non-Final Office Action dated Nov. 7, 2024 for U.S. Appl. No. 18/438,775, 33 pp.
Non-Final Office Action dated Aug. 28, 2024 for U.S. Appl. No. 17/891,399, 32 pp.
Notice of Allowance dated Feb. 26, 2025 for U.S. Appl. No. 17/890,853.
Notice of Allowance dated Jun. 18, 2025 for U.S. Appl. No. 17/891,370, 34 pp.

(56) References Cited

OTHER PUBLICATIONS

Final Office Action dated Jan. 24, 2025 for U.S. Appl. No. 17/891,370, 56 pp.
Notice of Allowance dated Jan. 29, 2025 for U.S. Appl. No. 17/891,392.

* cited by examiner

COPY/PASTE OR DRAG-AND-DROP

DESTINATION

| SOURCE | SUPERVISED | UNSUPERVISED |
|---|---|---|
| SUPERVISED | ALLOW | BLOCK |
| UNSUPERVISED | ALLOW | ALLOW |

FIG. 7

VISUAL INDICATOR OF APPLICATION OF SECURITY POLICY

PRIORITY CLAIM

This application claims priority to U.S. Provisional Patent Application No. 63/260,408, titled "SECURE COMPUTING ENVIRONMENT FOR MIXED USE COMPUTER," filed on Aug. 19, 2021, the entire disclosure of which is incorporated herein by reference.

TECHNICAL FIELD

Embodiments pertain to computer architecture. Some embodiments relate to a secure computing environment for a mixed use computer.

BACKGROUND

A user of a computer, such as an employee of a business, may use the same computer for business and personal use. The computer may store business applications or files together with personal applications or files. As the foregoing illustrates, techniques for providing a secure computing environment for a mixed use computer may be desirable.

BRIEF DESCRIPTION OF THE DRAWINGS

FIG. 7 illustrates a table of operations that may be allowed or blocked by a security policy, in accordance with some embodiments.

DETAILED DESCRIPTION

Figure 1:
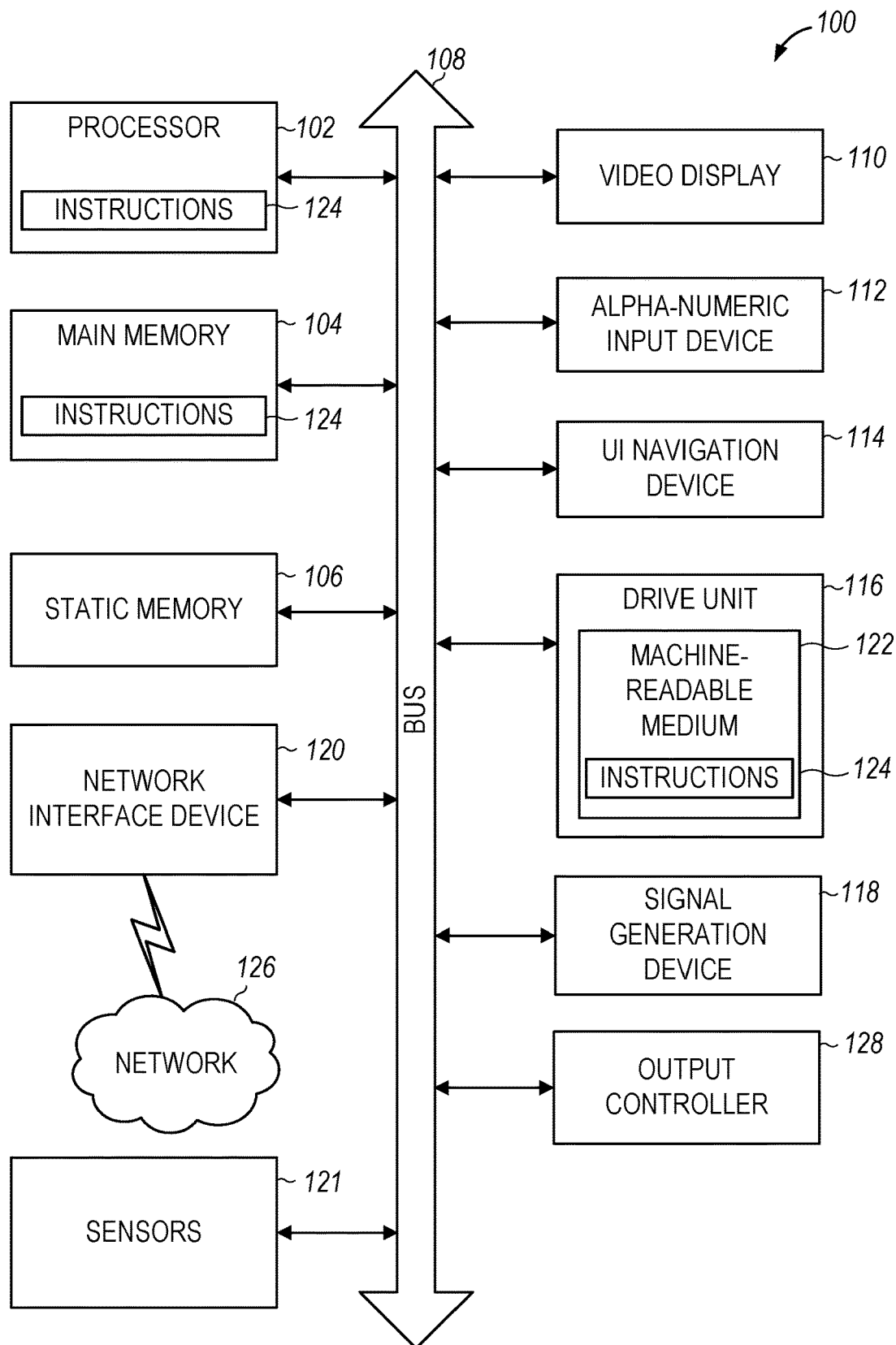
FIG. 1 is a block diagram of a computing machine, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "model" encompasses its plain and ordinary meaning. A model may include, among other things, one or more engines which receive an input and compute an output based on the input. The output may be a classification. For example, an image file may be classified as depicting a cat or not depicting a cat. Alternatively, the image file may be assigned a numeric score indicating a likelihood whether the image file depicts the cat, and image files with a score exceeding a threshold (e.g., 0.9 or 0.95) may be determined to depict the cat.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

As used herein, the term "application" encompasses its plain and ordinary meaning. An application may include software stored at a computing machine and executing on that computing machine. An application may include software that executes on a computing machine but is stored remotely or in the cloud. An application may include a website that includes software, stored at a server or in the cloud, for executing at a computing machine. In some cases, rather than being stored in software, an application may be hard-wired into a computing machine or into remote server(s).

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display unit 110 (or other display unit), an alphanumeric input device 112 (e.g., a keyboard), and a user interface (UI) navigation device 114 (e.g., a mouse). In an example, the display unit 110, input device 112 and UI navigation device 114 may be a touch screen display. The computing machine 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

A user of a computer, such as an employee of a businesses, may use the same computer for business and personal use. The computer may store business applications or files that the business may wish to subject to its security policy, and personal applications or files that the user does not wish to share with the business. Alternatively, a user of a non-business computer may wish to segregate applications or files used for certain purposes (e.g., investment management, family purposes, dating, and the like) for different treatment with respect to a security policy. As the foregoing illustrates, techniques for providing a secure computing environment for a mixed use computer may be desirable.

As used herein, the phrase "mixed use computer" (or, alternatively, mixed use computing machine, mixed use computing device, and the like) encompasses its plain and ordinary meaning. A mixed use computer may store computing resources (e.g., applications, files, cloud file storage access, emails, videos, photos, and the like), some of which are associated with a security policy and others of which are not. For example, a user might use a computer for both personal and business use. The computer may store, in the same user profile (e.g., user account associated with a login identifier and, in some cases, a password for accessing resources at the computer), business computing resources (e.g., patent applications, office action responses, client pitches, and business email messages that the user uses for business purposes) and personal computing resources (e.g., personal email messages, personal letters, photographs, and videos). The business may wish to enforce a business security and tracking policy for the business computing resources, while foregoing applying the business security policy and assuring the user's privacy in the personal computing resources. Alternatively, this invention may be used to separate any types of computing resources for which the security policy does/does not apply, not necessarily business/personal computing resources.

As discussed above, a mixed use computer may store both personal and business computing resources (e.g., applications or files). Informing the user which computing resources are (or are not) subject to a security policy and/or tracking may be desirable.

As used herein, the phrase "security policy" encompasses its plain and ordinary meaning. A security policy defines authorized and unauthorized actions with respect to a set of computing resources (e.g., business computing resources or each and every computing resource at the computing machine), and prevents a computing machine from taking unauthorized actions. A security policy may include various access permissions (e.g., by antivirus or other software) and computing resource sharing permissions. The security policy may require that certain actions (e.g., entering a password, verifying user identity by fingerprint or facial scan, and the like) be taken before accessing a computing resource covered by the security policy or before sharing (e.g., via a messaging service) the computing resource covered by the security policy.

In some cases, the security policy may include a tracking policy or a monitoring policy. For example, the tracking policy or the monitoring policy may allow a supervisor (e.g., at a remote computing machine) to monitor activity of the user of the computing machine with respect to the computing resources covered by the tracking policy or the monitoring policy. The tracking policy or the monitoring policy may store records of the activity of the user of the computing machine with respect to the computing resources at a server or a data repository that is accessible to the supervisor.

Computing resources that are covered and not covered by the security policy (e.g., business and personal resources) may be segregated in different ways. For example, computing resources that are covered by the security policy may reside in different directories in the file system from resources that are not covered by the security policy. Alternatively, computing resources having certain file types (e.g., file types associated with a word processor, such as .docx files) or having been created by certain software may be covered by the security policy, while files having other file types (e.g., file types associated with photographs, such as .jpg files) or having been created by other software might not be covered by the security policy, regardless of the directory where the files reside.

A computing machine may have multiple security policies. For example, a computing machine may have an antivirus security policy for each and every computing resource on the computing machine. The computing machine may also have a business computing resource security policy, which applies certain rules to business computing resources but not other computing resources.

A computing resource may include, for example, a file, an application, a network interface overlay (e.g., a network tunnel), a window or the like. A computing resource may be stored in a memory of a computing machine.

Figure 2:
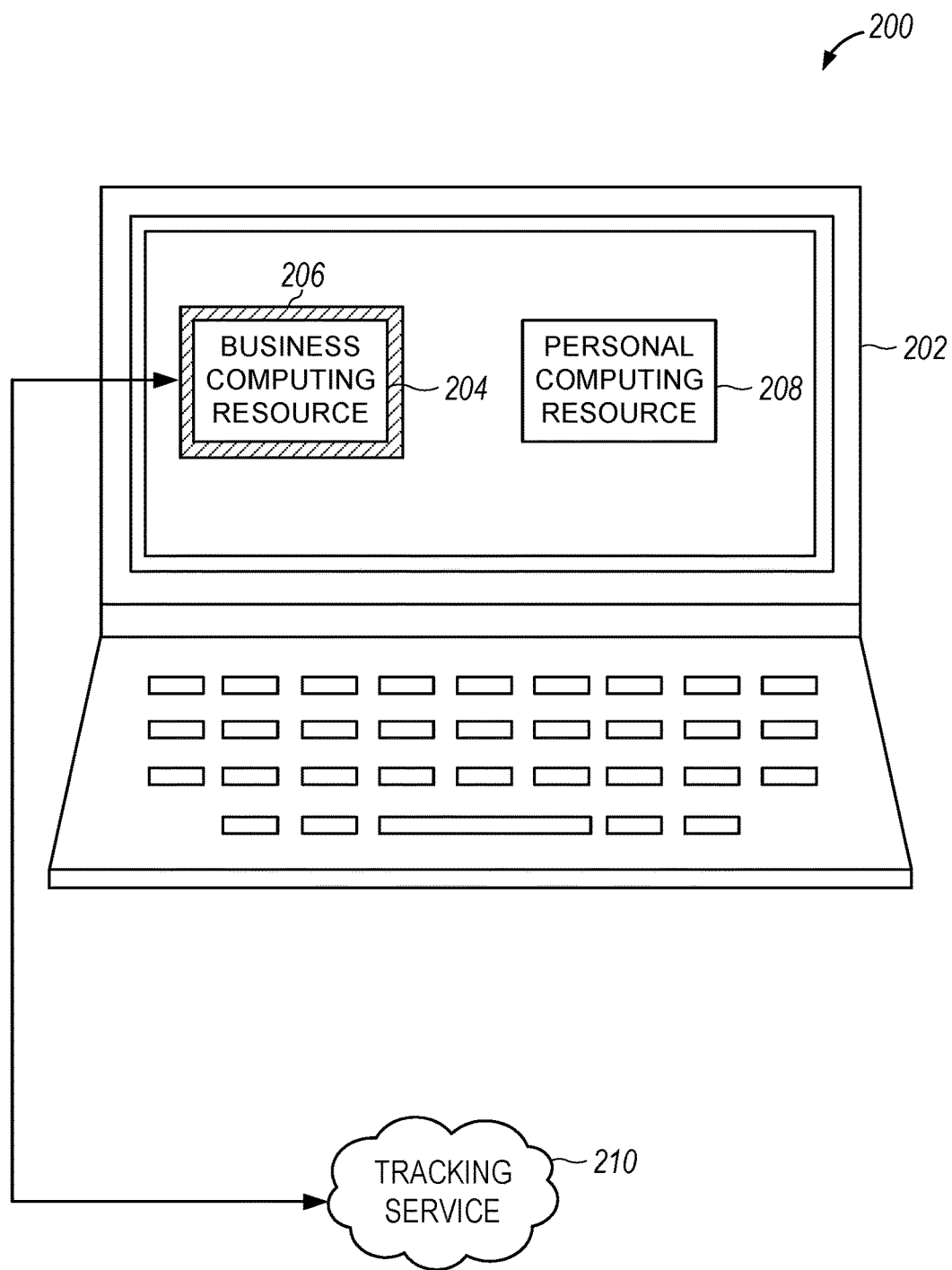
FIG. 2 illustrates an example system in which a mixed used computing machine may be used, in accordance with some embodiments.

FIG. 2 illustrates an example system 200 in which a mixed used computing machine may be used. As shown, the system 200 includes a computing machine 202 and a tracking service 210. As shown, the computing machine 202 is a laptop computer. However, in alternative embodiments, the computing machine 202 may be any computing machine that includes processing circuitry and memory, for example, a desktop computer, a mobile phone, a tablet computer, a smart watch, a personal digital assistant (PDA), and the like. The computing machine 202 may include all or a portion of the components of the computing machine 100. As shown, the tracking service 210 is a cloud service. The tracking service 210 may include one or more of a cloud-based tracking service, one or more servers, an administrator computing device associated with a security policy enforced at the computing machine 202, and the like.

The computing machine 202 may store multiple personal computing resources and multiple business computing resources. Some of those resources, for example, personal computing resource 208 and business computing resource 204, may be displayed via a display unit (e.g., screen or monitor) of the computing machine 202. Both the business computing resource 204 and the personal computing resource 208 may be displayed via a native computing environment of the computing machine 202, rather than by accessing a remote virtual machine or physical machine.

The personal computing resources and the business computing resources may be segregated in different ways. In some embodiments, personal computing resources and business computing resources reside in specified predefined locations of a file system. For example, certain directories may be associated with business computing resources and certain other directories may be associated with personal computing resources. In some embodiments, the personal computing resources are associated with personal filetypes (e.g. jpg or .mp3) while the business computing resources are associated with business filetypes (e.g., .doc or .xls). In some embodiments, the personal computing resources are generated by certain applications (e.g., a camera application) while the business computing resources are generated by certain other applications (e.g., a word processor, a spreadsheet program, or a slide presentation program).

As used herein, the phrase "native computing environment" encompasses its plain and ordinary meaning. A computing resource (e.g., an application, a file or a window) runs in a native computing environment if it is run directly in an operating system (e.g., of a physical computing machine storing the computing resource, without any external software layers and without requiring access to a virtual machine or virtualization software or, alternatively, directly on a virtual machine).

In some embodiments, a "supervised zone" (which could also be referred to as a "business zone" or "work zone") may be defined within the native computing environment of a computing machine. The supervised zone may include computing resources residing in a portion of a filesystem of the computing machine or of a cloud storage unit. The supervised zone may also include network interface overlays (e.g., network tunnels) for accessing the network. The supervised zone may include certain applications. In some embodiments, a security policy may be applied to computing resources within the supervised zone but not to computing resources external to the supervised zone.

The computing machine 202 may store a security policy that applies to the business computing resources but not to the personal computing resources. The security policy may limit screen capture of the business computing resources, sharing of the business computing resources, copying data from the business computing resources, and the like. The security policy may also allow for tracking, by the tracking service 210, of use of the business computing resources at the computing machine 202. While enforcing the security policy, the tracking service 210 might not track the user of personal computing resources at the computing device.

As shown in FIG. 2, the computing machine 202 displays, on a coupled display unit, the business computing resource 204 and the personal computing resource 208. A visual indicator 206 adjacent to the business computing resource 204 indicates that the business computing resource 204 is subject to the security policy and to tracking by the tracking service 210. The personal computing resource 208 lacks such a visual indicator because it is not subject to the security policy and to the tracking by the tracking service 210. As shown, the visual indicator 206 is a border. However, in other embodiments, the visual indicator 206 may include one or more of a border, a badge, and the like.

In some embodiments, the visual indicator 206 is a border. The border may occupy points outside the business computing resource 204 that are within a distance of n or fewer pixels from the business computing resource 204 (where n is a positive integer), unless those pixels are occupied by other computing resources (e.g., windows) that are more dominant than the business computing resource 204 in a computing resource stack. The other computing resources may be more dominant, for example, if they have been used more recently than the business computing resource 204. This is illustrated, for example, in FIGS. 4A-4B, and discussed in more detail below.

As discussed above, business computing resources are subject to the security policy and the tracking. Personal computing resources are not subject to the security policy and the tracking. However, in alternative embodiments, computing resources different from personal/business may be used. For example, a parent might give a child a computing machine with some resources (e.g., web browser, video player) that the parent wishes to track and/or manage and other resource (e.g., word processor, chess playing application stored in memory) that the parent does not wish to track and/or manage. Alternatively, an investor might wish to have his/her financial advisor be able to track and/or manage resources (e.g., investment company website, investment company application) that are used for investment management purposes but not other resources (e.g., other websites, applications or files).

Figure 3:
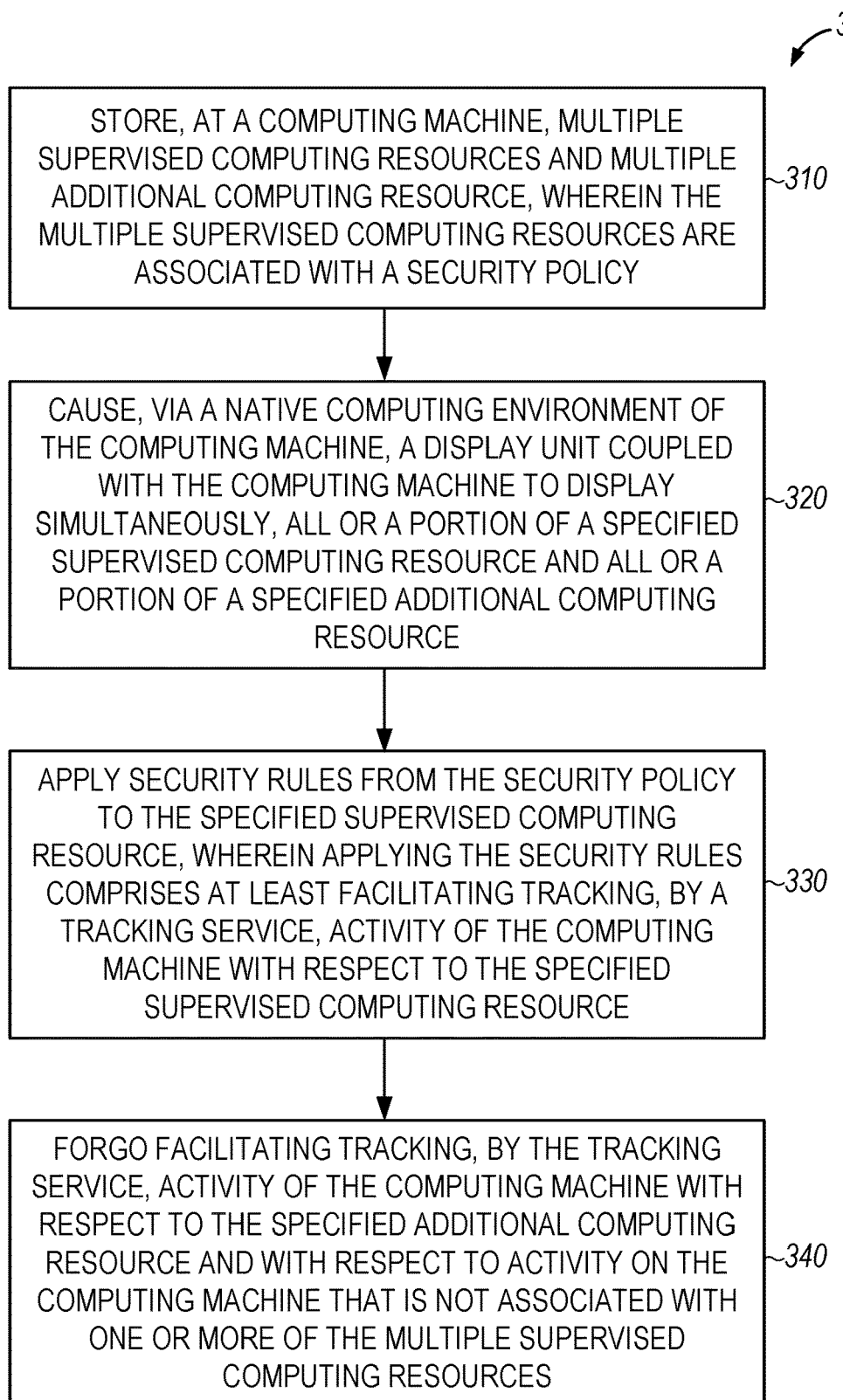
FIG. 3 is a flowchart of an example process associated with providing a visual tracking indicator, in accordance with some embodiments.

FIG. 3 is a flowchart of an example process 300 associated with providing a visual tracking indicator. In some implementations, one or more process blocks of FIG. 3 may be performed by a computing machine (e.g., computing machine 100). In some implementations, one or more process blocks of FIG. 3 may be performed by another device or a group of devices separate from or including the computing machine. Additionally, or alternatively, one or more process blocks of FIG. 3 may be performed by one or more components of computing machine 100, such as processor 102, main memory 104, static memory 106, network interface device 120, video display 110, alpha-numeric input device 112, UI navigation device 112, drive unit 116, signal generation device 118, and output controller 128.

As shown in FIG. 3, process 300 may include storing, at a computing machine, multiple supervised computing resources and multiple additional computing resources, wherein the multiple supervised computing resources are associated with a security policy (block 310). For example, the computing machine may store multiple supervised computing resources and multiple additional computing resources, wherein the multiple supervised computing resources are associated with a security policy, as described above.

As further shown in FIG. 3, process 300 may include causing, via a native computing environment of the computing machine, a display unit coupled with the computing machine to display simultaneously, all or a portion of a specified supervised computing resource and all or a portion of a specified additional computing resource (block 320). For example, the computing machine may cause, via a native computing environment of the computing machine, a display unit coupled with the computing machine to display simultaneously, all or a portion of a specified supervised computing resource and all or a portion of a specified additional computing resource, as described above.

As further shown in FIG. 3, process 300 may include applying security rules from the security policy to the specified supervised computing resource, wherein applying the security rules comprises at least facilitating tracking activity of the computing machine with respect to the specified supervised computing resource (block 330). For example, the computing machine may apply security rules from the security policy to the specified supervised computing resource, wherein applying the security rules comprises at least facilitating tracking activity of the computing machine with respect to the specified supervised computing resource, as described above.

As further shown in FIG. 3, process 300 may include forgoing facilitating tracking activity of the computing machine with respect to the specified additional computing resource and with respect to activity on the computing machine that is not associated with one or more of the multiple supervised computing resources (block 340). For example, the computing machine may forgo facilitating tracking activity of the computing machine with respect to the specified additional computing resource and with respect to activity on the computing machine that is not associated with one or more of the multiple supervised computing resources, as described above.

Process 300 may include additional implementations, such as any single implementation or any combination of implementations described below and/or in connection with one or more other processes described elsewhere herein.

In a first implementation, the additional computing resources comprise personal computing resources, wherein the supervised computing resources comprise business computing resources, wherein the multiple supervised computing resources and the multiple additional computing resources comprise files, cloud file storage access, applications or websites. Cloud file storage access may include access to a network-based file storage system (e.g., OneDrive for Business® developed by Microsoft Corporation of Redmond, Washington).

In a second implementation, process 300 includes foregoing applying security rules from the security policy to the specified additional computing resource.

In a third implementation, process 300 includes displaying, in association with the specified supervised computing resource, a visual indicator indicating that tracking is ongoing.

In a fourth implementation, the visual indicator comprises a badge or a border adjacent to a region of the display unit occupied by the specified supervised computing resource, the visual indicator is established upon launch of the supervised computing resource, and the visual indicator is removed upon exit from the supervised computing resource or a log out by a user of the computing machine. For example, the user may access a webpage associated with his/her employer in a web browser. Upon login to an account via the webpage, the visual indicator may appear around the web browser. At a later time, when the user logs out from the account via the webpage or closes the web browser, the visual indicator may be removed.

In a fifth implementation, the activity of the computing machine with respect to the specified supervised computing resource and the activity of the computing machine with respect to the specified additional computing resource comprise network traffic.

In a sixth implementation, the activity of the computing machine with respect to the specified supervised computing resource and the activity of the computing machine with respect to the specified additional computing resource comprise internet browsing.

In a seventh implementation, the activity of the computing machine with respect to the specified supervised computing resource and the activity of the computing machine with respect to the specified additional computing resource comprise camera or microphone input activity.

In an eighth implementation, process 300 includes storing information transmitted from the computing machine to the tracking service, and providing for display, in response to a user request, of a visual representation of the information transmitted from the computing machine to the tracking service.

In a ninth implementation, the tracking service comprises one or more of a cloud-based tracking service, one or more servers, and an administrator computing device associated with the security policy.

In a tenth implementation, the security rules comprise one or more rules blocking a set of operations from the specified supervised computing resource to the specified additional computing resource, and the set of operations comprises at least one of a drag and drop operation, a copy and paste operation, a cut and paste operation, a key log operation, a file download operation, a file upload operation, a file attachment operation, a printing operation, an opening a specific website operation, an opening a category of website operation, an application launching operation or a screenshot operation. In other words, the security rules may prevent certain operations from the specified supervised computing resource to the specified additional computing resource. For example, the user may be unable to drag and drop, copy and paste, or cut and paste content from the specified supervised computing resource to the specified additional computing resource. The user may be unable to implement key logging within the specified supervised computing resource and access the logged keys from the specified additional computing resource. The user may be unable to take a screenshot of the specified supervised computing resource and place that screenshot into the specified additional computing resource (or view the screenshot via the specified additional computing resource).

In one example use case, a user has open, on her desktop computer, a work file (a word processing document comprising a draft real estate purchase contract for a client) and a personal file (a word processing document comprising a letter to the user's grandmother). The real estate purchase contract is surrounded by a green border and has an elliptical badge indicating that it is a work file that is a supervised computing resource. The letter to the grandmother is not surrounded by such a border. The user attempts to copy text from one part of the draft real estate purchase contract into another part of the draft real estate purchase contract and is able to do so. The user then opens the letter to the grandmother and presses a shortcut key for pasting (e.g., CTRL+ V). However, the text from the draft real estate purchase contract is not pasted into the letter to the grandmother due to the blocking of such pasting by the security rules in the security policy. According to some implementations, the security policy communicates with the driver of the desktop computer, which enforces the security rules to block the pasting of the text from the draft real estate purchase contract into the letter to the grandmother because the draft real estate purchase contract is a supervised computing resource and the letter to the grandmother is not a supervised computing resource. Similar techniques may be used to prevent other operations from supervised computing resource(s) to additional (unsupervised) computing resource(s).

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4B:
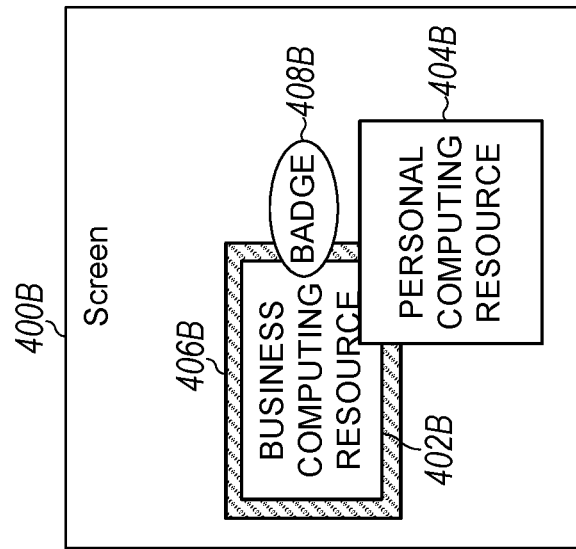
FIGS. 4A-4B illustrate example screens visually indicating tracked and untracked resources, in accordance with some embodiments.
Figure 4A:
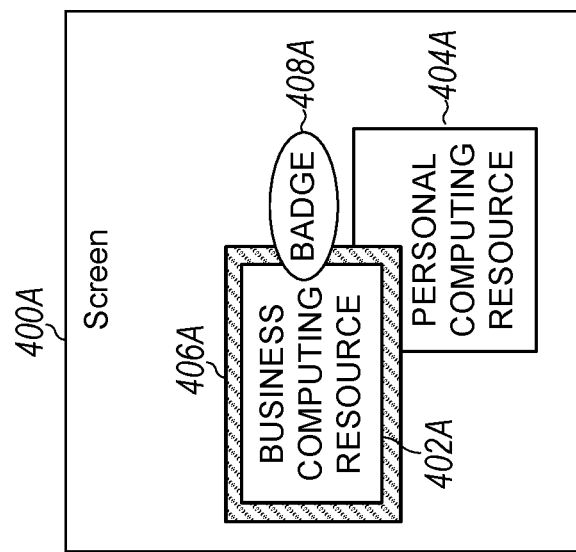

FIGS. 4A-4B illustrate example screens 400A and 400B visually indicating tracked (e.g., by a security policy) and untracked resources. While the screens 400A and 400B are shown, it should be noted that other display devices or display units (e.g., projectors, monitors, and the like) may be used in place of screens.

As shown in FIG. 4A, screen 400A displays a business computing resource 402A and a personal computing resource 404A. The business computing resource 402A is tracked, based on a security policy of the associated business, while the personal computing resource 404A is not tracked and is not covered by the security policy. As illustrated in FIG. 4A, the business computing resource 402A is the dominant computing resource (e.g., because it was the last selected computing resource) and partially occludes the personal computing resource 404A. As shown, the business computing resource 402A is surrounded by a border 406A and has an adjacent badge 408A.

As shown in FIG. 4B, similarly to FIG. 4A, screen 400B displays a business computing resource 402B and a personal computing resource 404B. However, in screen 400B, the personal computing resource 404B is the dominant computing resource (e.g., because it was the last selected computing resource) and partially occludes the business computing resource 404B. As shown, the business computing resource 402B is surrounded by a border 406B and has an adjacent badge 408B.

Computing resources (e.g., windows) that are open at the computing machine may be arranged from most dominant to least dominant in a dominance stack (e.g., the last selected computing resource is the most dominant and is at the top of the stack, the second to last selected computing resource is the second most dominant and is in the second position from the top of the stack, etc., in a last-in-first-out data structure). The border 406A/406B and/or the badge 408A/408B may have the same position in the dominance stack as the business computing resource 402A/402B. Thus, when the business computing resource 402A overlays the personal computing resource 404A (e.g., the business computing resource 402A is closer to the top of the stack as the business computing resource 402A was more recently selected), the border 406A or the badge 408A may also overlay the personal computing resource 404A, as shown in FIG. 4A. When the personal computing resource 404B overlays the business computing resource 402B (e.g., the personal computing resource 404B is closer to the top of the stack as the personal computing resource 404B was more recently selected), the personal computing resource 404B may also overlay the border 406B or the badge 408B, as shown in FIG. 4B.

The business computing resource 402A/402B and the personal computing resource 404A/404B may both be associated with a native computing environment of a computing machine associated with the screen 400A/400B.

The border 406A/406B and/or the badge 408A/408B indicate that the security policy is appliable to the business computing resource 402A/402B. As the personal computing resource 404A/404B lacks a border and/or a badge, a viewer of the screen 400A/400B may visually determine that the security policy is not applicable to the personal computing resource 404A/404B.

In screen 400A, the border 406A occludes the personal computing resource 404B because the business computing resource 402A is more dominant (e.g., in a stack of computing resources, e.g., windows in some Microsoft® operating systems) than the personal computing resource 404B. However, in screen 400B, the personal computing resource 404B occludes the border 406B because the personal computing resource 404B is more dominant (e.g., in a stack of computing resources, e.g., windows in some Microsoft® operating systems) than the business computing resource 402B.

The business computing resource 402A is subject to a security policy (e.g., associated with the business), while the personal computing resource 404A/404B is not subject to the security policy. For example, the business may be a law firm and the business computing resource may be a contract being drafted by an attorney at the law firm. The personal computing resource may be a personal photograph of the attorney's family. The border 406A/406B identifies computing resources that are subject to the security policy. As a result, a user of the screen 400A/400B can quickly identify which displayed computing resources are and are not subject to the security policy.

The badge 408A/408B, when selected (e.g., by a mouse click or a touch of a touchscreen or, alternatively, by clicking a mouse while a cursor is positioned over the badge 408/408B) displays information about the security policy (e.g., which actions the user of the screen 400A/400B is or is not permitted to do with respect to the business computing resource 402A/402B).

In some embodiments, the border 406A/406B occupies pixels that are external to the business computing resource 402A/402B, within a threshold distance (e.g., n pixels, where n is a positive integer) from an edge of the business computing resource 402A/402B, and not occupied by the badge 408A/408B.

In some embodiments, the business computing resource 402A/402B and the personal computing resource 404A/404B that are displayed on the screen 400A/400B are each associated with a display priority value (e.g., based on a time when the displayed computing resource was last selected). The border 406A/406B comprises pixels that are not occupied by a computing resource that has a higher priority value than the business computing resource 402A/402B (e.g., that was selected after a last selection time of the specified supervised computing resource). For example, in screen 400A, the business computing resource 402A has a higher priority value than the personal computing resource 404A. As a result, the border 406A overlays the personal computing resource 404A. In contrast, in the screen 400B, the business computing resource 402B has a lower priority value than the personal computing resource 404B. As a result, the personal computing resource 404B overlays the border 404B.

In some embodiments, the business computing resource 402A may be dragged along the screen 400A. (For example, a user may select a title bar of the business computing resource 402A with a mouse and move the mouse along the screen 400A. Alternatively, if the screen 400A is a touch screen, the user may select the title bar using a finger or a stylus on the touch screen 400A, and move the finger or the stylus along the touch screen 400A.) Processing circuitry in a computing machine associated with the screen 400A may recalculate a position of the border 406A and/or the badge 408A in a discrete manner once every n milliseconds or based on operating system window events, where n is a predetermined positive number. As a result, the processing circuitry (e.g., the central processing unit or the graphics processing unit) might not become overburdened with border 406A and/or badge 408A position calculations every time the business computing resource 402A is dragged.

In conjunction with FIGS. 4A-4B, some embodiments are described with business computing resources being subject to the security policy and personal computing resources not being subject to the security policy. However, any predefined computing resources may replace the business computing resources that are subject to the security policy and the personal computing resources that are not subject to the security policy.

For example, a parent might show movies to a child from the parent's movie-watching computing device using screensharing techniques, with movies appropriate for children under age 13 not having the security policy applied (as the personal computing resources above), and movie appropriate for children ages 13-17 having the security policy applied (as the business computing resources above). Using the techniques disclosed herein, the parent may be able to show the child G rated movies appropriate for children under age 13 without interference by the security policy. When the parent wishes to show the child PG-13 rated movies appropriate for children ages 13-17, the security policy may apply. The security policy may, for example, prevent the showing of the PG-13 movies, notify the other parent when PG-13 rated movies are shown, require the parent to take an additional affirmative step (e.g., typing a password or a reason for showing the PG-13 movie into a pop-up window) to show the PG-13 movies.

As described above, the border 406A/406B and the badge 408A/408B indicate that a resource associated with the border 406A/406B and the badge 408A/408B is covered by the security policy. However, the border 406A/406B and the badge 408A/408B may be used to segregate other resources. For example, the border 406A/406B and the badge 408A/408B may be used to segregate business computing resources and personal computing resources where no security policy is applied to both the business computing resources and the personal computing resources. The computing machine displaying the screens 400A/400B may identify a given computing resource as being a personal computing resource or a business computing resource based on at least one of: a location of the computing resource in a directory of file system, a cloud storage location, an application associated with the computing resource, a file type of the computing resource, or a source (e.g., email, browser, network-based storage, and the like) of the computing resource.

Figure 5:
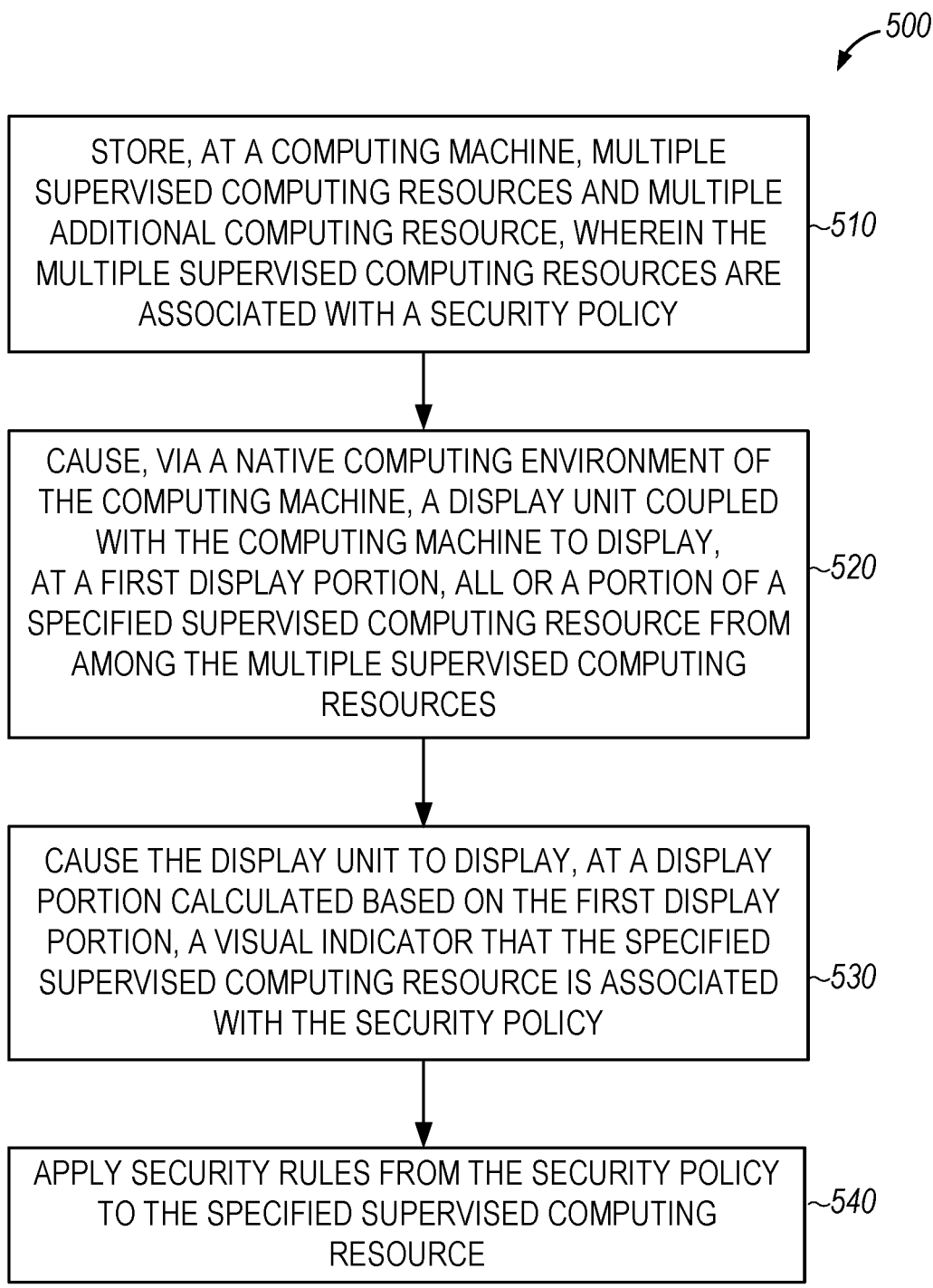
FIG. 5 is a flowchart of an example process associated with visually indicating tracked resources, in accordance with some embodiments.

FIG. 5 is a flowchart of an example process associated with visually indicating tracked resources. In some implementations, one or more process blocks of FIG. 5 may be performed by a computing machine (e.g., computing machine 100). In some implementations, one or more process blocks of FIG. 5 may be performed by another device or a group of devices separate from or including the computing machine. Additionally, or alternatively, one or more process blocks of FIG. 5 may be performed by one or more components of computing machine 100, such as processor 102, main memory 104, static memory 106, network interface device 120, video display 110, alpha-numeric input device 112, UI navigation device 112, drive unit 116, signal generation device 118, and output controller 128.

As shown in FIG. 5, process 500 may include storing, at a computing machine, multiple supervised computing resources and multiple additional computing resources, wherein the multiple supervised computing resources are associated with a security policy (block 510). For example, the computing machine may store multiple supervised computing resources and multiple additional computing resources, wherein the multiple supervised computing resources are associated with a security policy, as described above.

As further shown in FIG. 5, process 500 may include causing, via a native computing environment of the computing machine, a display unit coupled with the computing machine to display, at a first display position, all or a portion of a specified supervised computing resource from among the multiple supervised computing resources (block 520). For example, the computing machine may cause, via a native computing environment of the computing machine, a display unit coupled with the computing machine to display, at a first display position, all or a portion of a specified supervised computing resource from among the multiple supervised computing resources, as described above.

As further shown in FIG. 5, process 500 may include causing the display unit to display, at a display position calculated based on the first display position, a visual indicator that the specified supervised computing resource is associated with the security policy (block 530). For example, the computing machine may cause the display unit to display, at a display position calculated based on the first display position, a visual indicator that the specified supervised computing resource is associated with the security policy, as described above.

As further shown in FIG. 5, process 500 may include applying security rules from the security policy to the specified supervised computing resource (block 540). For example, the computing machine may apply security rules from the security policy to the specified supervised computing resource, as described above.

Process 500 may include additional implementations, such as any single implementation or any combination of implementations described below and/or in connection with one or more other processes described elsewhere herein.

According to some embodiments, an additional computing resource may also be displayed at the display unit. The additional display unit may lack the visual indicator. As a result, a user of the computing machine, while viewing the display unit, may be able to easily determine which computing resources are (or are not) associated with the security policy.

In a first implementation, the additional computing resources comprise personal computing resources, wherein the supervised computing resources comprise business computing resources, wherein the multiple supervised computing resources and the multiple additional computing resources comprise files, cloud file storage access, applications or websites.

In a second implementation, the additional computing resources comprise computing resources of a first type, wherein the supervised computing resources comprise computing resources of a second type for which an entity (e.g., a user or an organization) desires enhanced security, wherein the multiple supervised computing resources and the multiple additional computing resources comprise files, cloud file storage access, applications or websites.

In a third implementation, the visual indicator comprises a badge proximate to an edge of the first display position, the badge indicating that the security policy is applicable to the specified supervised computing resource.

In a fourth implementation, process 500 includes receiving a signal representing a user selection of the badge, and causing, in response to the user selection of the badge, the display unit to display information about the security policy applicable to the computing machine.

In a fifth implementation, the visual indicator comprises a border, wherein the border comprises pixels that are external to the first display position, within a threshold distance from an edge of the first display position, and not occupied by a badge associated with the visual indicator.

In a sixth implementation, multiple computing resources are displayed on the display unit, wherein each displayed computing resource is associated with a display priority value based on a time when the displayed computing resource was last selected, wherein the border comprises pixels that are not occupied by a computing resource that was selected after a last selection time of the specified supervised computing resource.

In a seventh implementation, process 500 includes receiving, at processing circuitry of the computing machine, a signal representing dragging the specified supervised computing resource along the display unit, recalculating, using the processing circuitry, a position of the border in a discrete manner once every n milliseconds or based on operating system window events, wherein n is a predetermined positive number.

In an eighth implementation, process 500 includes generating a pop-up or an on-display alert by the specified supervised computing resource, and causing display of the border around the pop-up or the on-display alert.

In a ninth implementation, process 500 includes receiving, at the computing machine, a user request to perform an action that violates a security rule, and permitting, based on a setting stored in conjunction with the security policy and provided by an administrator of the security policy, the user to perform the action that violates the security rule in response to an additional affirmative act by the user confirming that the user wishes to perform the action.

In a tenth implementation, process 500 includes causing, via the native computing environment of the computing machine, the display unit to display, at a second display position, all or a portion of a specified additional computing resource from among the multiple additional computing resources, foregoing causing the display unit to display, in association with the specified additional computing resource, the visual indicator, and foregoing applying security rules from the security policy to the specified additional computing resource.

In an eleventh implementation, process 500 includes causing, via a native computing environment of the computing machine, the display unit coupled with the computing machine to display, at a predefined display position, indicia of multiple computing resources open on the computing device, wherein indicia of supervised computing resources are coupled with a visual symbol indicating that the supervised computing resources are associated with the security policy.

In a twelfth implementation, indicia of additional computing resources are not coupled with the visual symbol.

In a thirteenth implementation, the displayed indicia of the multiple computing resources comprise a task bar or a dock.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In some embodiments, multiple computing resources (e.g., windows or files) associated with the same application may be open simultaneously. For example, a user of a computing machine that has a single word processor application (e.g., Microsoft Word® or Apache OpenOffice Writer®) may have two word processor files open simultaneously—a patent application document associated with a business security policy (or any other security policy) and a personal letter document not associated with the business security policy. (For example, the patent application document may reside within a business directory of the filesystem, while the personal letter document may reside within a personal directory of the filesystem.) The patent application document may be coupled with a visual indicator (e.g., border or badge) while the personal letter document might not be coupled with the visual indicator. Thus, the user may be able to easily determine which security settings apply to the resources that he/she has open on the computing machine. Typically, a computing machine runs a single instance of the application. To create separate instance of the same application, some embodiments force the computing machine to emulate all operating system processes and operating system resources (e.g., global objects, remote procedure calls, and the like) associated with the application separately for personal resources and for business resources. This is illustrated, for example, in FIG. 10, with an emulated registry and emulated global objects being used instead of the native computing environment's default registry and global objects within the work zone.

In some embodiments, business computing resources and personal computing resources (or other computing resources that are covered/not covered by the security policy) may be visually segregated (as well as being segregated in a filesystem, according to some implementations). For example, a display unit coupled with the computing machine may display a business visual container (e.g., a box on the screen) from which business computing resources may be accessed. Personal computing resources may be displayed outside the business visual container, or may be accessed via the start menu, file explorer, and the like. In addition, some business computing resource may, in some cases, also be accessible via the start menu, file explorer, and the like. This may be done by emulating several subsystems that are meant to be shared by all user mode applications. By creating emulation subsystems at that are undocumented at the kernel and user mode levels, as well as keeping up with the compatibility of years of different operating system (e.g., Microsoft Windows®) applications the business computing resources are segregated from the personal computing resources while preserving the user experience that is familiar when interacting with native operating system concepts (i.e., opening a file by double clicking a mouse as the cursor is hovering over an icon associated with the file). In some embodiments, the operations described here are performed in a real time manner without impacting performance of the applications and user experience, as well as the security of the applications and operating system.

Figure 6:
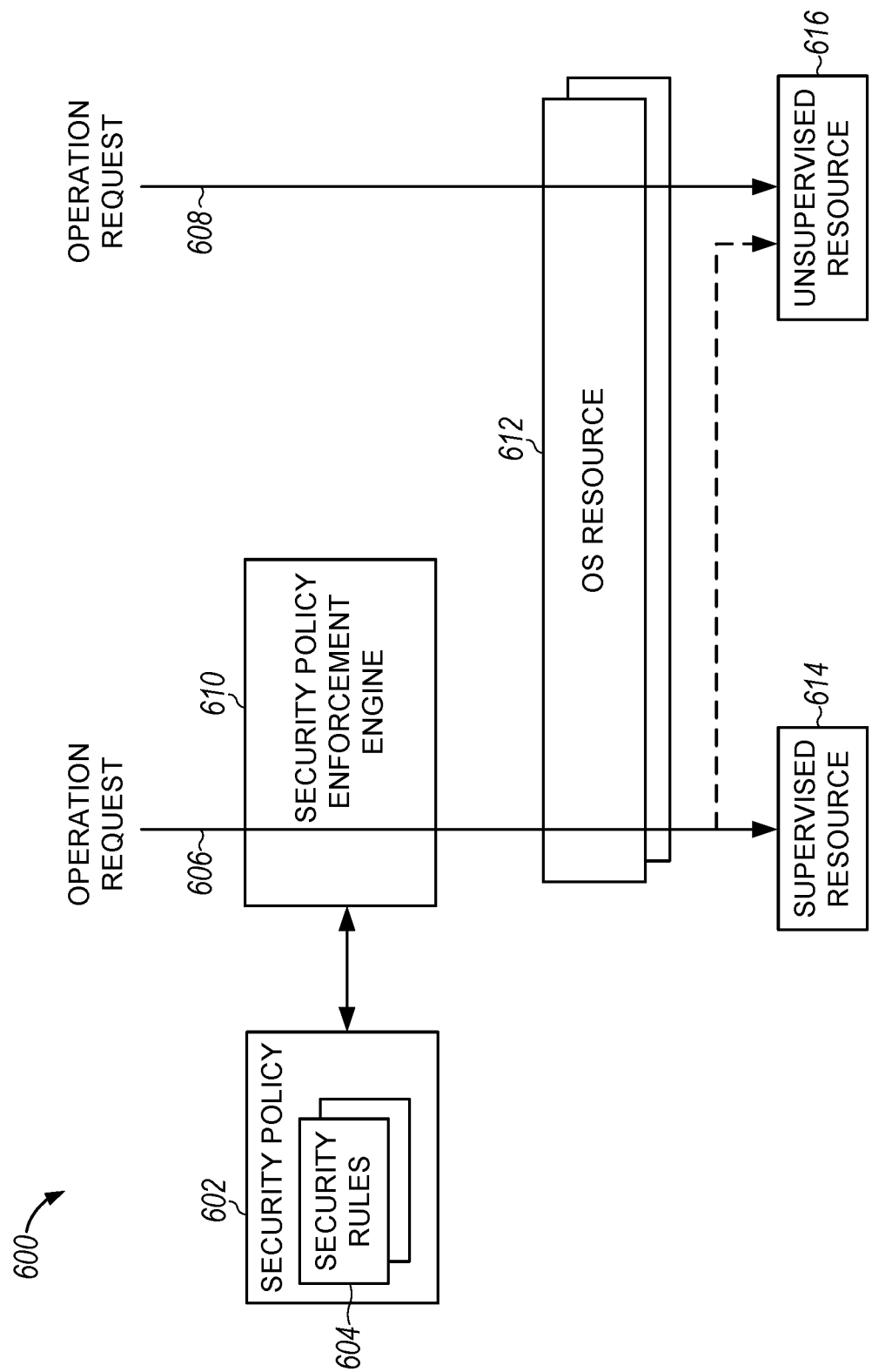
FIG. 6 illustrates an example system in which operations may be restricted based on a security policy, in accordance with some embodiments.

FIG. 6 illustrates an example system 600 in which operations may be restricted based on a security policy, in accordance with some embodiments. The system 600 may include all or a portion of the components of the computing machine 100 of FIG. 1.

As shown, the system 600 stores a security policy 602, which includes security rules 604. The security policy is applicable to the supervised resource 614 (and other supervised resources), but not to the unsupervised resource 616 (and other unsupervised resources). Each of the supervised resource 614 and the unsupervised resource 616 is a computing resource. The supervised resource 614 and/or the unsupervised resource 616 may be a file and/or an application. The security policy 614 may be enforced using a security policy enforcement engine 610. As illustrated in FIG. 6, the system includes operating system (OS) resources 612. The OS resources 612 may include a controller (e.g., a driver) associated with an input device or an output device coupled to the system 600. The OS resources 612 may be drivers or other hardware controllers, for example, a keyboard driver, a mouse driver, a touchscreen driver, a display driver, and the like. The OS resources may be computing resources.

FIG. 6 illustrates processing of operation requests 606 and 608. As shown, the operation request 608 is associated with the unsupervised resource 616, but not with any supervised resource 614. The operation request 608 is provided directly to the OS resource 612 and/or the unsupervised resource 616.

The operation request 606 is associated with the supervised resource 614 (and, in some cases, also the unsupervised resource 616). Based on the operation request 606 being associated with the supervised resource 616, the operation request 606 is intercepted by the security policy enforcement engine 610 and modified prior to provision to the OS resource 612 and/or the supervised resource 614 (and, in some cases, the unsupervised resource 616). For example, as described in more detail in conjunction with FIG. 8, if the operation request 606 is for a screen capture (e.g., screenshare or screenshot) operation, the security policy enforcement engine 610 may cause parts of the screen associated with the supervised resource 614 to be occluded and/or watermarked within the screen captured image.

In some embodiments, the supervised resources, including the supervised resource 614, are business resources. The unsupervised resources, including unsupervised resource 616, are personal computing resources. The supervised resources and/or the unsupervised resources include files and/or applications. The security rules 604 from the security policy 602 are applied to the multiple supervised resources and are not applied to the multiple unsupervised resources.

The supervised resources may map to certain file types, file sources, or directories within a file system. The unsupervised resources may include resources that do not map to those file types, fie sources or directories within the file system. The security policy 602 may include security rules 604 preventing the system 600 from taking certain actions with respect to the supervised resources (e.g., supervised resources might not be able to be copied in a screen capture operation without first receiving affirmative approval (e.g., via a pop-up window) from a user of the system 600).

The system 600 receives a signal representing an operation request 606 or 608. The signal may be received via input devices of the system 600, for example, via a keyboard, mouse or touchscreen. Alternatively, the signal may be received over a network.

The system 600 determines, based on an active computing resource and other computing resources open at the computing machine when the signal is received, whether the specified operation is associated with the supervised computing resource 614 from among the multiple supervised computing resources. If not, the operation request 608 is provided to the OS resource 612 and/or the unsupervised resource 616 without accessing the security policy enforcement engine 610.

In response to determining that the specified operation 606 is associated with the supervised computing resource 614, the system 600 provides the request for the specified operation 606 to the security policy enforcement engine 610. The security policy enforcement engine 610 intercepts the request. The security policy enforcement engine 610 adjusts, based on security rules 604 in the security policy 602, the operation request 606 or a state of the supervised resource 614 prior to providing the request to the OS resource 612 and/or the supervised resource 614.

In some cases, the operation request 606 is associated with both the supervised resource 614 and the unsupervised resource 616. The system 600 provides the request to the OS resource 612, the supervised resource 614, and the unsupervised resource 616 after adjusting the operation request 606 or the state of the one or more of the multiple supervised resources, including the supervised resource 614.

In some embodiments, the operation request 606 is for a copy operation. The active computing resource at the system 100 is the supervised resource 614. The security policy enforcement engine 610, based on the security rules 604 in the security policy 602, causes data copied by the copy operation to be intercepted. The intercepted data is accessible via the multiple supervised computing resources but not accessible via the multiple unsupervised computing resources.

In response to a subsequent paste operation, the system 600 grants access to the intercepted data to respond to the paste operation request if the paste operation request is associated with one of the multiple supervised computing resources. The system 600 denies access to the intercepted data to respond to the paste operation request if the paste operation request is not associated with any one of the multiple supervised computing resources.

In some embodiments, the operation request 606 is for a keyboard input. The active computing resource is supervised resource 614. The security policy enforcement engine 610, based on the security rules 604 in the security policy 602, blocks access, by unsupervised resources including the unsupervised resource 616, to the keyboard input provided to the supervised resource 616.

In some embodiments, the operation request 606 is for a drag-and-drop operation. The active computing resource, associated with initiation of the drag-and-drop operation, is the supervised resource 614. The security policy enforcement engine 610, based on the security rules 604 in the security policy 602, causes data copied by the drag-and-drop operation to be accessible via the multiple supervised computing resources but not accessible via the multiple unsupervised computing resources.

The drag-and-drop operation may terminate at a destination computing resource. The security policy enforcement engine 610 grants access to respond to the drag-and-drop operation request if the destination computing resource is one of the multiple supervised resources. The security policy enforcement engine 610 denies access to respond to the drag-and-drop operation request if the destination computing resource is not one of the multiple supervised resources.

In some embodiments, the operation request 606 is for a screen capture (e.g., screenshot or screensharing) operation. The security policy enforcement engine 610, based on the security rules 604 in the security policy 602, blocks or watermarks screen capture of screen regions associated with supervised resources while allowing screen capture of screen regions not associated with the supervised resources. Watermarking includes overlaying the screen regions associated with the computing resources with a representation of the security policy (e.g., a logo of a business associated with the security policy.

For example, the security policy enforcement engine 606 determines whether the supervised resource 614, for which screen capture is to be blocked, leverages graphics processing unit (GPU) hardware acceleration. If the supervised resource 614 leverages hardware acceleration, the security policy enforcement engine 610 causes the GPU to occlude or watermark a region associated with the supervised resource 614 on a display unit coupled to the system 600 during the screen capture operation. If the supervised resource 614 does not leverage hardware acceleration, the security policy enforcement engine 610 occludes or watermarks a representation of the supervised resource 614 within an output of the screen capture operation. If the supervised resource 614 does not leverage hardware acceleration, the security policy enforcement engine 610 foregoes occluding and forgoes watermarking the regions associated with the supervised resource 614 on the display unit.

As used herein, the phrase "hardware acceleration" may refer, among other things, to a process by which application(s) may offload certain computing tasks onto specialized hardware components within a computer system, enabling greater efficiency than is possible in software running on a general-purpose central processing unit (CPU) alone. For example, visualization processes may be off-loaded onto a GPU in order to enable faster, higher-quality playback of videos and games, while also freeing up the CPU to perform other tasks.

In some embodiments, some computing resources (e.g., computing resources in a downloads or email attachments directory) may be isolated (e.g., to prevent software in those computing resources from accessing other computing resources, such as the supervised resource 614 and the unsupervised resource 616, in the system 600). When an operation request attempts to access an isolated computing resource, that operation request may be processed by the security policy enforcement engine 610 prior to provision to the OS resource 612 and/or the isolated computing resource.

FIG. 7 illustrates a table 700 of operations that may be allowed or blocked by a security policy, in accordance with some embodiments. As shown, the table 700 applies to copy/paste or drag-and-drop operations. As illustrated in FIG. 7, when the source computing resource is a supervised computing resource and the destination computing resource is a supervised computing resource, the operation is allowed. When the source computing resource is a supervised computing resource and the destination computing resource is an unsupervised computing resource, the operation is blocked. When the source computing resource is an unsupervised computing resource and the destination computing resource is a supervised computing resource, the operation is allowed. When the source computing resource is an unsupervised computing resource and the destination computing resource is an unsupervised computing resource, the operation is allowed.

Figure 8:
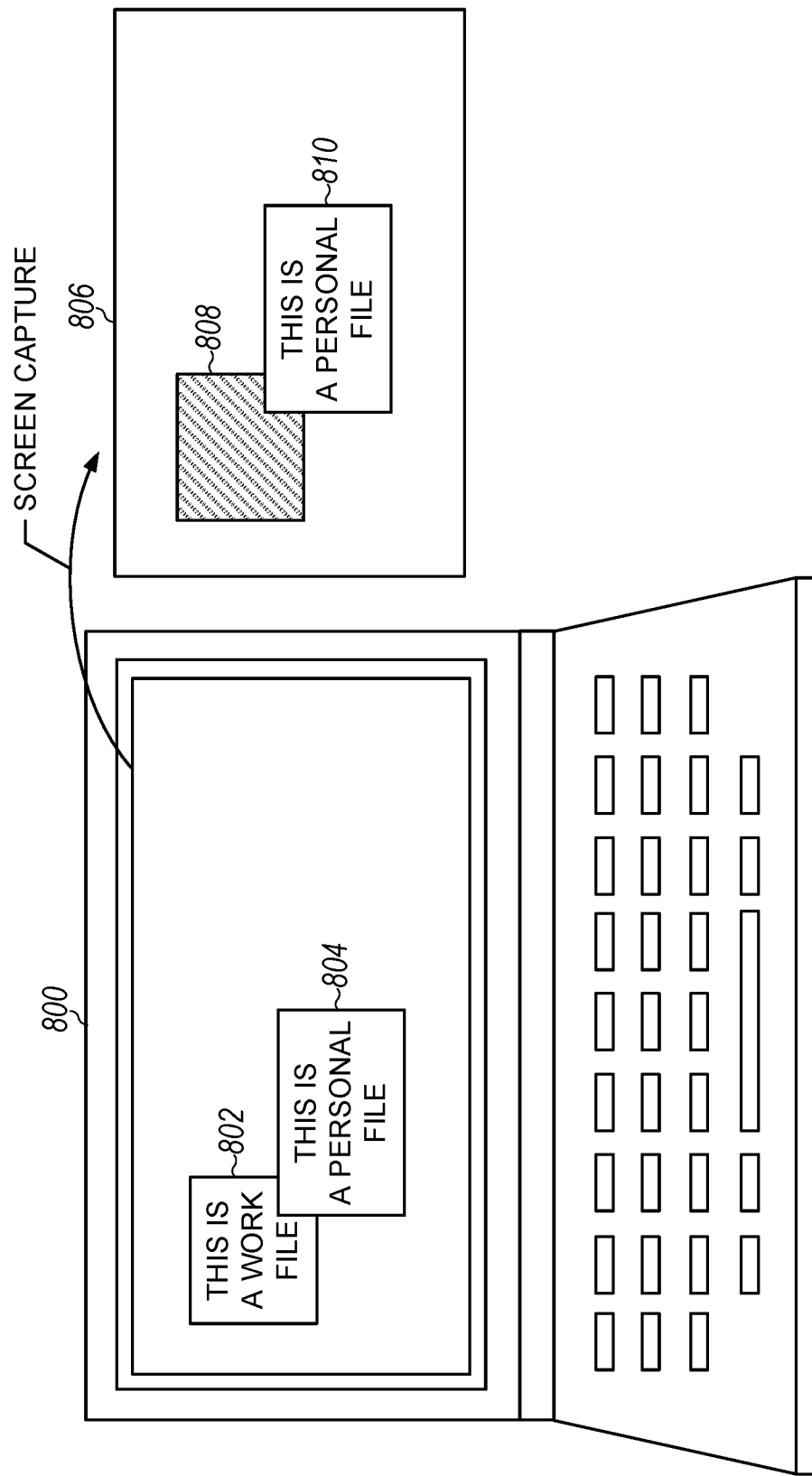
FIG. 8 illustrates an example input and output of a screen capture operation, in accordance with some embodiments.

FIG. 8 illustrates an example input and output of a screen capture operation, in accordance with some embodiments. As shown, the input to the screen capture operation is the screen 800. The screen 800 displays a visual output from a supervised computing resource 802 and a visual output from an unsupervised computing resource 804. The screen capture operation results in image 806. As shown, image 806 includes a block 810 corresponding to the visual output from the unsupervised resource 804. Block 808 corresponds to the visual output from the supervised computing resource 802. As shown, block 808 is occluded or watermarked. In some embodiments, block 808 may include all or a portion of a company logo or other visual information that is distinct from the visual output from the supervised resource 802. In some embodiments, block 808 may include the background of the screen, as though the supervised computing resource 802 was not open on the screen. As a result, the user may be prevented from taking a screenshot or screensharing data from supervised resources. In some cases, the user may be able to override the occlusion or watermarking of the visual output from all or a portion of the supervised resources.

Figure 9:
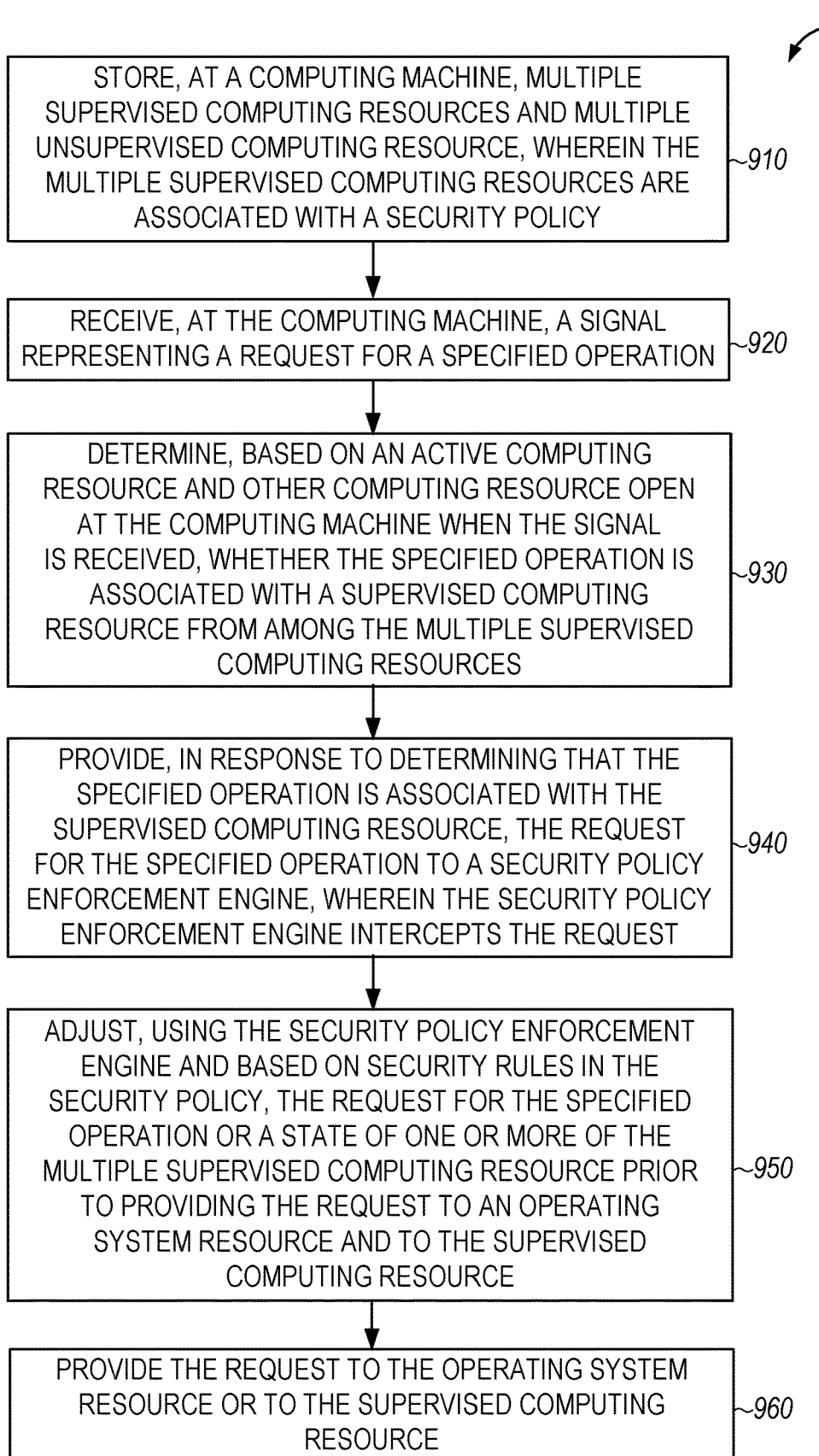
FIG. 9 is a flowchart of an example process associated with operation restriction based on security policy, in accordance with some embodiments.

FIG. 9 is a flowchart of an example process 900 associated with operation restriction based on security policy. In some implementations, one or more process blocks of FIG. 9 may be performed by a computing machine (e.g., computing machine 100). In some implementations, one or more process blocks of FIG. 9 may be performed by another device or a group of devices separate from or including the computing machine. Additionally, or alternatively, one or more process blocks of FIG. 9 may be performed by one or more components of computing machine 100, such as processor 102, main memory 104, static memory 106, network interface device 120, video display 110, alpha-numeric input device 112, UI navigation device 112, drive unit 116, signal generation device 118, and output controller 128.

As shown in FIG. 9, process 900 may include storing, at a computing machine, multiple supervised computing resources and multiple unsupervised computing resources, wherein the multiple supervised computing resources are associated with a security policy (block 910). For example, the computing machine may store, at a computing machine, multiple supervised computing resources and multiple unsupervised computing resources, wherein the multiple supervised computing resources are associated with a security policy, as described above.

As further shown in FIG. 9, process 900 may include receiving, at the computing machine, a signal representing a request for a specified operation (block 920). For example, the computing machine may receive, at the computing machine, a signal representing a request for a specified operation, as described above.

As further shown in FIG. 9, process 900 may include determining, based on an active computing resource and other computing resources open at the computing machine when the signal is received, whether the specified operation is associated with a supervised computing resource from among the multiple supervised computing resources (block 930). For example, the computing machine may determine, based on an active computing resource and other computing resources open at the computing machine when the signal is received, whether the specified operation is associated with a supervised computing resource from among the multiple supervised computing resources, as described above.

As further shown in FIG. 9, process 900 may include providing, in response to determining that the specified operation is associated with the supervised computing resource, the request for the specified operation to a security policy enforcement engine, wherein the security policy enforcement engine intercepts the request (block 940). For example, the computing machine may provide, in response to determining that the specified operation is associated with the supervised computing resource, the request for the specified operation to a security policy enforcement engine, wherein the security policy enforcement engine intercepts the request, as described above.

As further shown in FIG. 9, process 900 may include adjusting, using the security policy enforcement engine and based on security rules in the security policy, the request for the specified operation or a state of one or more of the multiple supervised computing resources prior to providing the request to an operating system resource or to the supervised computing resource (block 950). For example, the computing machine may adjust, using the security policy enforcement engine and based on security rules in the security policy, the request for the specified operation or a state of one or more of the multiple supervised computing resources prior to providing the request to an operating system resource or to the supervised computing resource, as described above.

As further shown in FIG. 9, process 900 may include providing the request to the operating system resource or to the supervised computing resource (block 960). For example, the computing machine may provide the request to the operating system resource or to the supervised computing resource, as described above.

Process 900 may include additional implementations, such as any single implementation or any combination of implementations described below and/or in connection with one or more other processes described elsewhere herein.

In a first implementation, process 900 includes the supervised computing resources comprise organizational computing resources, the unsupervised computing resources comprise personal computing resources, the multiple supervised computing resources and the multiple unsupervised computing resources comprise files, cloud file storage access, applications or websites, and security rules from the security policy are applied to the multiple supervised computing resources and are not applied to the multiple unsupervised computing resources.

In a second implementation, process 900 includes foregoing adjusting the request using the security policy enforcement engine in response to determining that the specified operation is not associated with the supervised computing resource. In some cases, process 900 may include providing, in response to determining that the specified operation is not associated with the supervised computing resource, the request directly to the operating system resource without accessing the security policy enforcement engine.

In a third implementation, process 900 includes determining that the specified operation is associated with the supervised computing resource and an unsupervised computing resource, and providing, in response to determining that the specified operation is associated with the supervised computing resource and the unsupervised computing resource, the request to the device driver, the supervised computing resource, and the unsupervised computing resource after adjusting, by the security policy enforcement engine, the request for the specified operation or the state of the one or more of the multiple supervised computing resources.

In a fourth implementation, the operating system resource comprises a controller associated with an input device or an output device coupled to the computing machine.

In some implementations, the security rules comprise one or more rules blocking a set of operations from the specified supervised computing resource to the specified additional computing resource. The set of operations comprises at least one of: a drag and drop operation, a copy and paste operation, a cut and paste operation, a key log operation, a file download operation, a file upload operation, a file attachment operation, a printing operation, an opening a specific website operation, opening a category of website operation, an application launching operation or a screenshot operation.

In a fifth implementation, process 900 includes the specified operation comprises a copy operation, the active computing resource is the supervised computing resource, the security policy enforcement engine, based on the security rules in the security policy, causes data copied by the copy operation to be intercepted, and the intercepted data is accessible via the multiple supervised computing resources but not accessible via the multiple unsupervised computing resources.

In a sixth implementation, process 900 includes granting, based on the security rules in the security policy and in response to a paste operation request subsequent to the copy operation, access to the intercepted data to respond to the paste operation request if the paste operation request is associated with one of the multiple supervised computing resources (e.g., in response to determining that the paste operation is associated with one of the multiple supervised computing resources), and/or denying access to the intercepted data to respond to the paste operation request if the paste operation request is not associated with any one of the multiple supervised computing resources (e.g., in response to determining that the paste operation request is not associated with any one of the multiple supervised computing resources).

In a seventh implementation, process 900 includes the specified operation comprises a keyboard input, the active computing resource is the supervised computing resource, and the security policy enforcement engine, based on the security rules in the security policy, blocks access, by the unsupervised computing resources, to the keyboard input provided to the supervised computing resource.

In an eighth implementation, process 900 includes the specified operation comprises a drag-and-drop operation, the active computing resource, associated with initiation of the drag-and-drop operation, is the supervised computing resource, and the security policy enforcement engine, based on the security rules in the security policy, causes data copied by the drag-and-drop operation to be accessible via the multiple supervised computing resources but not accessible via the multiple unsupervised computing resources.

In a ninth implementation, the drag-and-drop operation terminates at a destination computing resource, the method further comprising granting access to respond to the drag-and-drop operation request if the destination computing resource is one of the multiple supervised computing resources (e.g., in response to determining that the destination computing resource is one of the multiple supervised computing resources), and/or denying access to respond to the drag-and-drop operation request if the destination computing resource is not one of the multiple supervised computing resources (e.g., in response to determining that the destination computing resource is not one of the multiple supervised computing resources).

In a tenth implementation, process 900 includes the specified operation comprises a screen capture operation, the security policy enforcement engine, based on the security rules in the security policy, blocks or watermarks screen capture of screen regions associated with supervised computing resources while allowing screen capture of screen regions not associated with the supervised computing resources, and watermarking comprises overlaying the screen regions associated with the computing resources with a representation of the security policy.

In an eleventh implementation, the screen capture operation comprises a screenshot operation or a screensharing operation.

In a twelfth implementation, process 900 includes determining whether a given supervised computing resource, for which screen capture is to be blocked, leverages graphics processing unit (GPU) hardware acceleration. If the given supervised computing resource leverages GPU hardware acceleration (in response to determining that the given supervised computing resource leverages GPU hardware acceleration): process 900 includes causing, by the security policy enforcement engine, the GPU to occlude or watermark a region associated with the given supervised computing resource on a display unit coupled to the computing machine during the screen capture operation. If the given supervised computing resource does not leverage GPU hardware acceleration (in response to determining that the given supervised computing resource does not leverage GPU hardware acceleration): process 900 includes occluding or watermarking a representation of the given supervised computing resource within an output of the screen capture operation; and forgoing occluding and forgoing watermarking the region associated with the given supervised computing resource on the display unit coupled to the computing machine.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
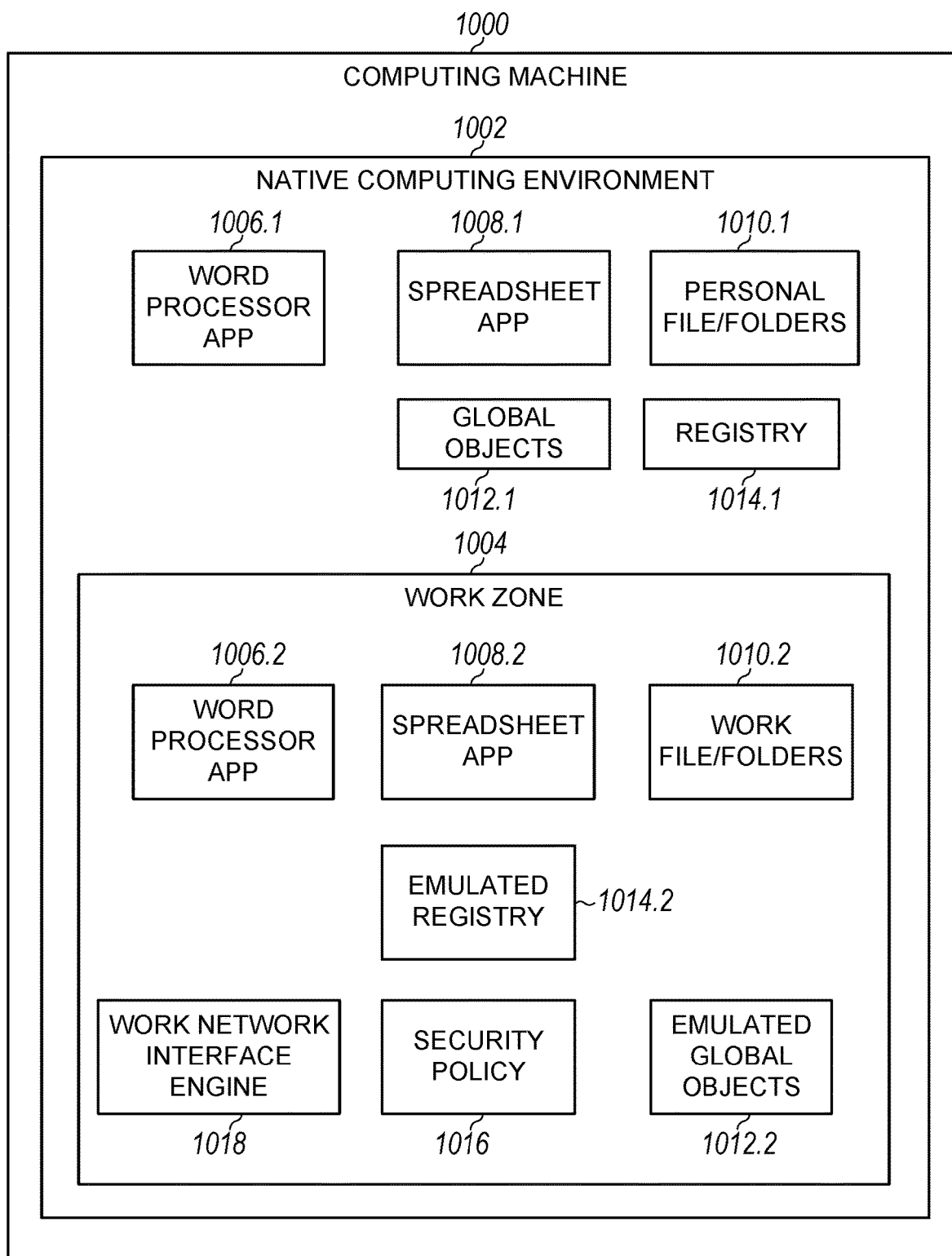
FIG. 10 is a block diagram of a computing machine with a work zone, in accordance with some embodiments.

FIG. 10 is a block diagram of a computing machine 1000 with a work zone 1004 within a native computing environment 1002, in accordance with some embodiments. As shown, the computing machine 1000 includes the native computing environment 1004. A portion of the native computing environment 1002 is the work zone 1004. As shown, the work zone 1004 is associated with a security policy 1016. The security policy applies to computing resources within the work zone 1004, but not to computing resources outside the work zone 1004. The work zone 1004 also includes a work network interface engine 1018. The work network interface engine 1018 processes network access requests associated with the work zone 1004 via a separate tunnel and/or a separate Internet Protocol (IP) address based on the security policy 1016. The work network interface engine 1018 may provide a VPN for computing resources within the work zone 1004 to use in order access the Internet. Computing resources outside the work zone 1004 might not use the VPN of the work network interface engine 1018.

As shown, the native computing environment 1002, outside the work zone 1004, includes applications, such as the illustrated word processor app 1006.1 and spreadsheet app 1008.1. When these applications are executed from the work zone 1004, separate instances of the applications, such as the word processor app 1006.2 and the spreadsheet app 1008.2 are created. The activities of the computing machine 1000 (e.g., the user's activities) in the word processor app 1006.2 and the spreadsheet app 1008.2 are supervised by the security policy 1016. However, the activities of the computing machine in the word processor app 1006.1 and the spreadsheet app 1008.1 are not supervised by the security policy 1016.

As shown, the native computing environment 1002 includes personal files/folders 1010.1 and work files/folders 1010.2. The work files/folder 1010.2 reside in the work zone 1004 and are supervised by the security policy 1016. The personal files/folders 1010.1 reside outside the work zone 1004 and are not supervised by the security policy 1016. According to some implementations, the personal files/folders 1010.1 and the work files/folders 1010.2 may correspond to different locations in a filesystem. For example, the personal files/folders 1010.1 may be at C:/personal/* and the work files/folders 1010.2 may be at C:/work/*, where * corresponds to a part of a file address string of the filesystem. The work zone 1004 may include the C:/work/* location of the filesystem where the work files/folders 1010.2 reside.

As shown, the native computing environment 1002 includes a registry 1014.1 externally to the work zone 1004. Within the work zone 1004, the registry is emulated as emulated registry 1014.2. Similarly, the native computing environment 1002 includes global objects 1012.1 externally to the work zone 1004. Within the work zone 1004, the global objects are emulated as emulated global objects 1012.2. When executing, applications 1006.2, 1008.2 within the work zone 1004 use the emulated registry 1014.2 and the emulated global objects 1012.2 instead of the registry 1014.1 and the global objects 1012.1. As a result, the object and registry values accessed by the executing applications 1006.2, 1008.2 within the work zone 1004 are supervised by the security policy 1016, and separate instances of the applications 1006, 1008 are used internally and externally to the work zone 1004.

In some embodiments, the computing machine 1000 stores, within a single user account, multiple supervised computing resources (e.g., work files/folders 1010.2) and multiple additional computing resources (e.g., personal files/folder 1010.1). The supervised computing resources are associated with the security policy 1016, while the unsupervised computing resources are not associated with the security policy 1016. The computing machine 1000 executes a first instance of a specified application (e.g., word processor app 1006.1 or spreadsheet app 1008.1) that lacks read access and lacks write access to any and all of the multiple supervised computing resources. The computing machine 1000 executes, simultaneously with the first instance, a second instance of the specified application (e.g., word processor app 1006.2 or spreadsheet app 1008.2) that accesses at least a portion (e.g., subset) of the multiple supervised computing resources. The computing machine 1000 applies rules from the security policy 1016 to the second instance of the specified application while foregoing applying the rules from the security policy 1016 to the first instance of the specified application.

In some embodiments, the computing machine 1000 stores multiple supervised computing resources (e.g., work files/folders 1010.2) and multiple additional computing resources (e.g., personal files/folders 1010.1). The multiple supervised computing resources are associated with the security policy 1016. The multiple supervised computing resources reside within a supervised zone (e.g., work zone 1004). The supervised zone comprises a portion (e.g., subset) of data associated with the native computing environment 1002 of the computing machine 1000. The computing machine 1000 executes a first instance of a specified application (e.g., word processor app 1006.1 or spreadsheet app 1008.1) externally to the supervised zone. The first instance has read access and has write access to data outside the supervised zone. The first instance lacks read access and lacks write access to data stored within the supervised zone. The computing machine 1000 executes, simultaneously with the first instance, a second instance of the specified application (e.g., word processor app 1006.2 or spreadsheet app 1008.2) within the supervised zone. The second instance has read access and lacks write access to data outside the supervised zone. The second instance has read access and has write access to data stored within the supervised zone. The second instance runs separately and distinctly from the first instance. For example, the second instance may leverage the emulated registry 1014.2 and the emulated global objects 1012.1 of the work zone 1004, while the first instance may leverage the registry 1014.1 and the global objects 1012.1 of the native computing environment 1002.

As used herein, a business may include a business, an organization, or any other entity type. A business may include an organization (e.g., a non-profit or a charity), a government entity (e.g., the Department of Motor Vehicles or the town tax collector), or a personal entity (e.g., a personal babysitting entity or a personal financial planning entity). The business resources may be any resources that are desirable to be segregated from personal resources by a business, an organization, a government entity, or a personal entity (e.g., a person who wants to segregate his/her babysitting or financial planning-related computing resources or to segregate other types of computing resources).

Figure 11:
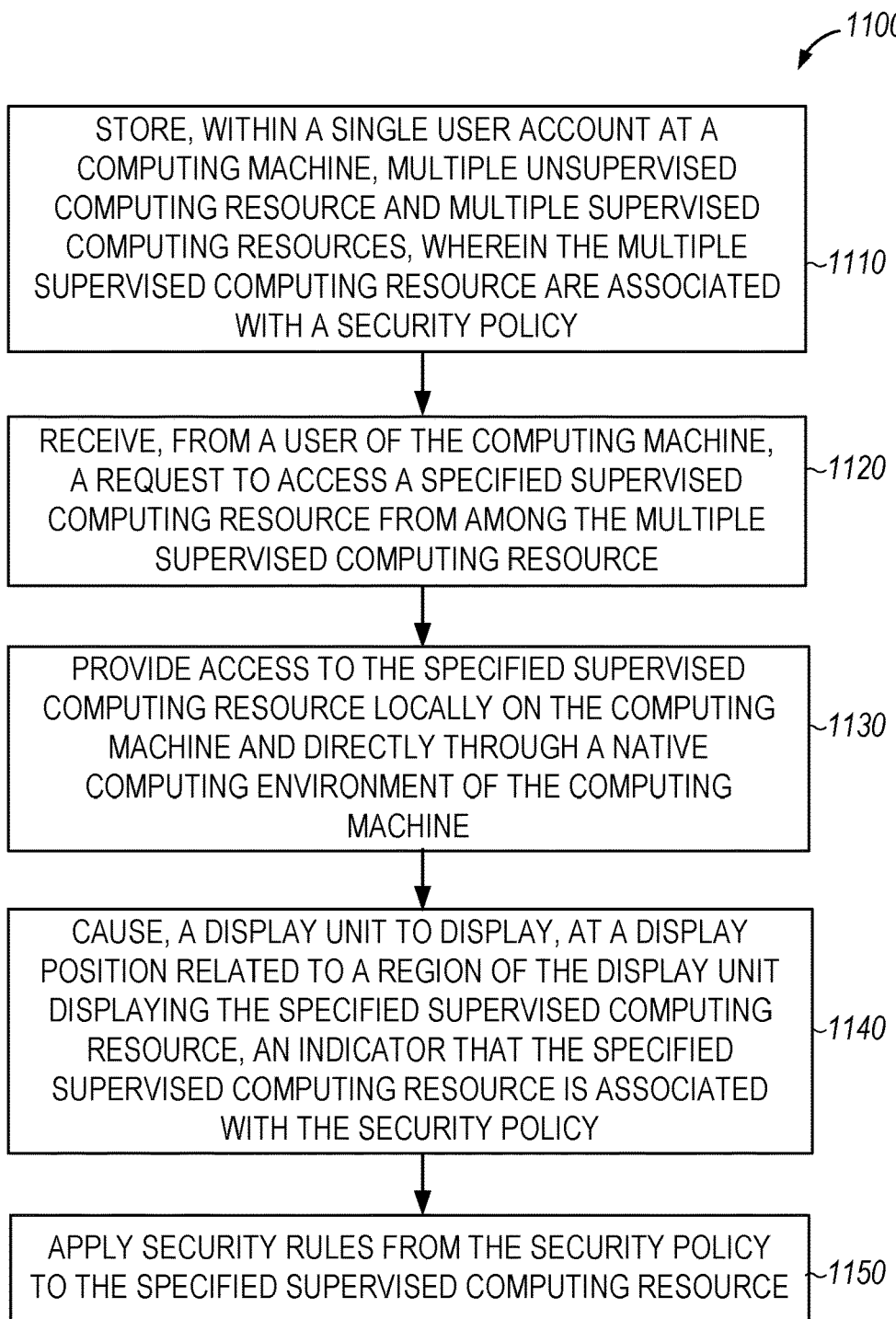
FIG. 11 is a flowchart of a first example process associated with a secure computing environment for a personal and business mixed use system, in accordance with some embodiments.

FIG. 11 is a flowchart of an example process 1100 associated with a secure computing environment for a personal and business mixed use system. In some implementations, one or more process blocks of FIG. 11 may be performed by a computing machine (e.g., computing machine 100). In some implementations, one or more process blocks of FIG. 11 may be performed by another device or a group of devices separate from or including the computing machine. Additionally, or alternatively, one or more process blocks of FIG. 11 may be performed by one or more components of computing machine 100, such as processor 102, main memory 104, static memory 106, network interface device 120, video display 110, alpha-numeric input device 112, UI navigation device 112, drive unit 116, signal generation device 118, and output controller 128.

As shown in FIG. 11, process 1100 may include storing, within a single user account at a computing machine, multiple unsupervised (e.g., personal) computing resources and multiple supervised (e.g., organizational or business) computing resources, wherein the multiple supervised computing resources are associated with a security policy (block 1110). For example, the computing machine may store, within a single user account at a computing machine, multiple unsupervised computing resources and multiple supervised computing resources, wherein the multiple business computing resources are associated with a security policy (e.g., an organizational security policy or a business security policy), as described above.

As further shown in FIG. 11, process 1100 may include receiving, from a user of the computing machine, a request to access a specified supervised computing resource from among the multiple supervised computing resources (block 1120). For example, the computing machine may receive, from a user of the computing machine, a request to access a specified supervised computing resource from among the multiple supervised computing resources, as described above.

As further shown in FIG. 11, process 1100 may include providing access to the specified supervised computing resource locally on the computing machine and directly through a native computing environment of the computing machine (block 1130). For example, the computing machine may provide access to the specified supervised computing resource locally on the computing machine and directly through a native computing environment of the computing machine, as described above.

As further shown in FIG. 11, process 1100 may include causing a display unit to display, at a display position related to a region of the display unit displaying the specified business computing resource, an indicator that the specified supervised computing resource is associated with the security policy (block 1140). For example, the computing machine may cause a display unit to display, at a display position related to a region of the display unit displaying the specified supervised computing resource, an indicator that the specified business computing resource is associated with the security policy, as described above.

As further shown in FIG. 11, process 1100 may include applying security rules from the security policy to the specified supervised computing resource (block 1150). For example, the computing machine may apply security rules from the security policy to the specified supervised computing resource, as described above.

Process 1100 may include additional implementations, such as any single implementation or any combination of implementations described below and/or in connection with one or more other processes described elsewhere herein.

In a first implementation, process 1100 includes receiving, from the user of the computing machine, a request to access a specified unsupervised computing resource from among the multiple unsupervised computing resources, providing access to the specified unsupervised computing resource locally on the computing machine and directly through a native computing environment of the computing machine, forgoing causing the display unit to display the indicator that the specified unsupervised computing resource is associated with the business security policy, and foregoing applying security rules from the security policy to the specified unsupervised computing resource.

In a second implementation, the multiple computing resources are not associated with the security policy.

In a third implementation, an administrator computing device, external to the computing machine, has access to the multiple supervised computing resources residing at the computing machine and lacks access to the multiple unsupervised computing resources residing at the computing machine.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
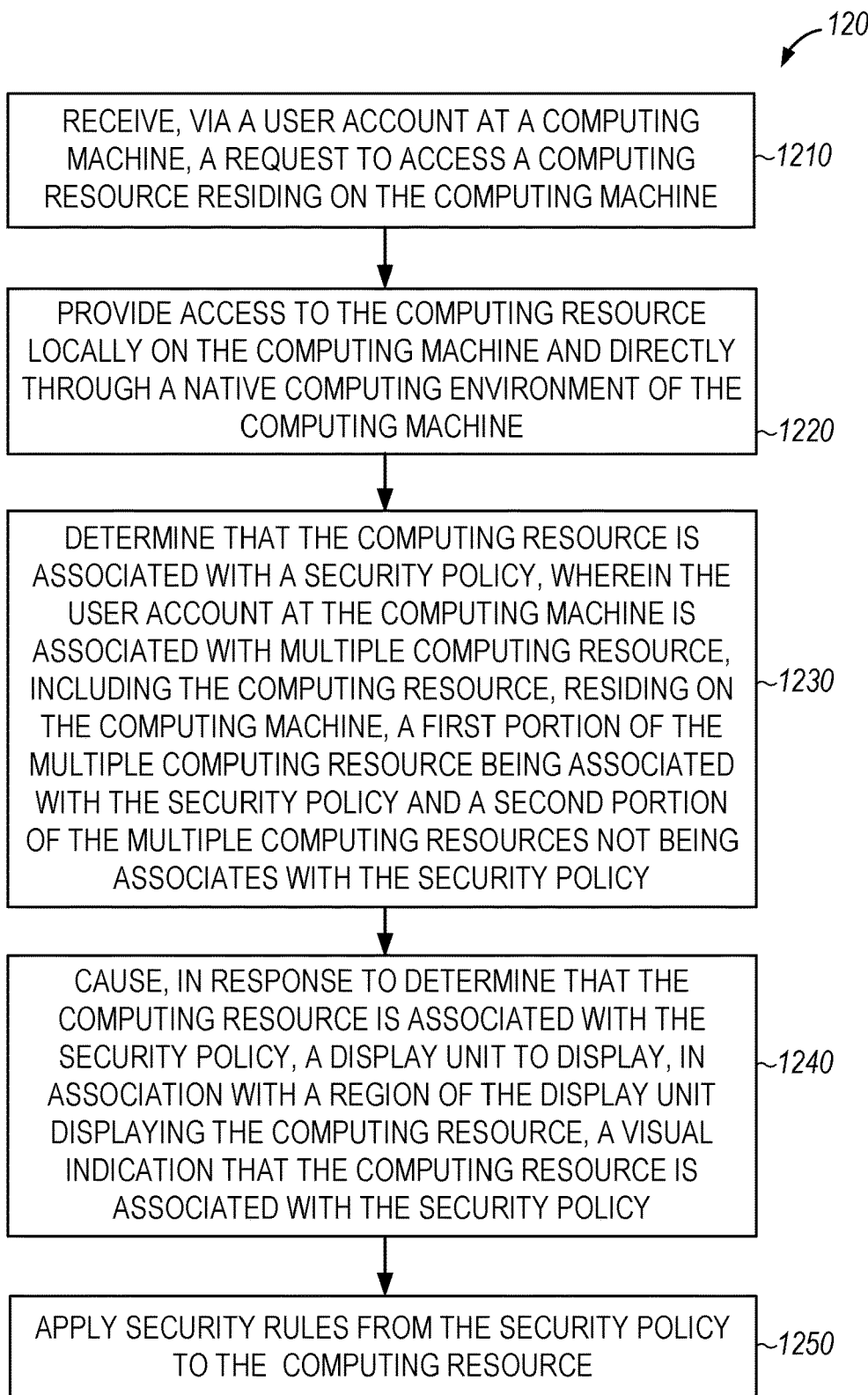
FIG. 12 is a flowchart of a second example process associated with a secure computing environment for a mixed use system, in accordance with some embodiments.

FIG. 12 is a flowchart of an example process 1200 associated with a secure computing environment for a mixed use system. In some implementations, one or more process blocks of FIG. 12 may be performed by a computing machine (e.g., computing machine 100). In some implementations, one or more process blocks of FIG. 12 may be performed by another device or a group of devices separate from or including the computing machine. Additionally, or alternatively, one or more process blocks of FIG. 12 may be performed by one or more components of computing machine 100, such as processor 102, main memory 104, static memory 106, network interface device 120, video display 110, alpha-numeric input device 112, UI navigation device 112, drive unit 116, signal generation device 118, and output controller 128.

As shown in FIG. 12, process 1200 may include receiving, via a user account at a computing machine, a request to access a computing resource residing on the computing machine (block 1210). For example, the computing machine may receive, via a user account at a computing machine, a request to access a computing resource residing on the computing machine, as described above.

As further shown in FIG. 12, process 1200 may include providing access to the computing resource locally on the computing machine and directly through a native computing environment of the computing machine (block 1220). For example, the computing machine may provide access to the computing resource locally on the computing machine and directly through a native computing environment of the computing machine, as described above.

As further shown in FIG. 12, process 1200 may include determining that the computing resource is associated with a security policy, wherein the user account at the computing machine is associated with multiple computing resources, including the computing resource, residing on the computing machine, a first portion (e.g., subset) of the multiple computing resources being associated with the security policy and a second portion (e.g., subset) of the multiple computing resources not being associated with the security policy (block 1230). For example, the computing machine may determine that the computing resource is associated with a security policy, wherein the user account at the computing machine is associated with multiple computing resources, including the computing resource, residing on the computing machine, a first portion of the multiple computing resources being associated with the security policy and a second portion of the multiple computing resources not being associated with the security policy, as described above.

As further shown in FIG. 12, process 1200 may include causing, in response to determining that the computing resource is associated with the security policy, a display unit to display, in association with a region of the display unit displaying the computing resource, a visual indication that the computing resource is associated with the security policy (block 1240). For example, the computing machine may cause, in response to determining that the computing resource is associated with the security policy, a display unit to display, in association with a region of the display unit displaying the computing resource, a visual indication that the computing resource is associated with the security policy, as described above.

As further shown in FIG. 12, process 1200 may include applying security rules from the security policy to the computing resource (block 1250). For example, the computing machine may apply security rules from the security policy to the computing resource, as described above.

Process 1200 may include additional implementations, such as any single implementation or any combination of implementations described below and/or in connection with one or more other processes described elsewhere herein.

In a first implementation, the computing resource is a website, an application or a file, wherein the computing machine is one of a laptop computer, a desktop computer, a mobile phone or a tablet computer.

In a second implementation, the security policy is an organizational security policy, wherein the computing machine stores an organizational set of computing resources associated with the organizational security policy and a personal set of computing resources not associated with the organizational security policy.

In a third implementation, the security rules from the security policy comprise one or more of blocking sharing of the computing resource, logging a reason for sharing of the computing resource, receiving a user confirmation before sharing of the computing resource, logging keystrokes while the computing resource is selected, and locking the computing resource in response to the computing machine being idle for at least a threshold time period.

In a fourth implementation, sharing comprises one or more of printing, screensharing, transmitting via email or a messaging service, dragging and dropping, cutting and pasting, downloading, uploading, attaching, printing, accessing a specific website, accessing a category of websites, launching an application or taking a screenshot.

In a fifth implementation, process 1200 includes deactivating one or more security rules from the security policy with respect to a computing resource in response to a user request, and logging a reason for the user request.

In a sixth implementation, process 1200 includes receiving, via a graphical user interface (GUI), an indication of a selection of the visual indication, and providing for display, in response to the selection of the visual indication, information regarding permissions of a user of the computing machine with respect to the computing resource or information regarding the security policy.

In a seventh implementation, process 1200 includes causing the display unit to simultaneously display the computing resource associated with the security policy and an additional computing resource not associated with the security policy, both the computing resource and the additional computing resource executing through the native computing environment of the computing machine.

In an eighth implementation, the visual indicator is displayed on or adjacent to a boundary of the region of the display unit displaying the computing resource.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
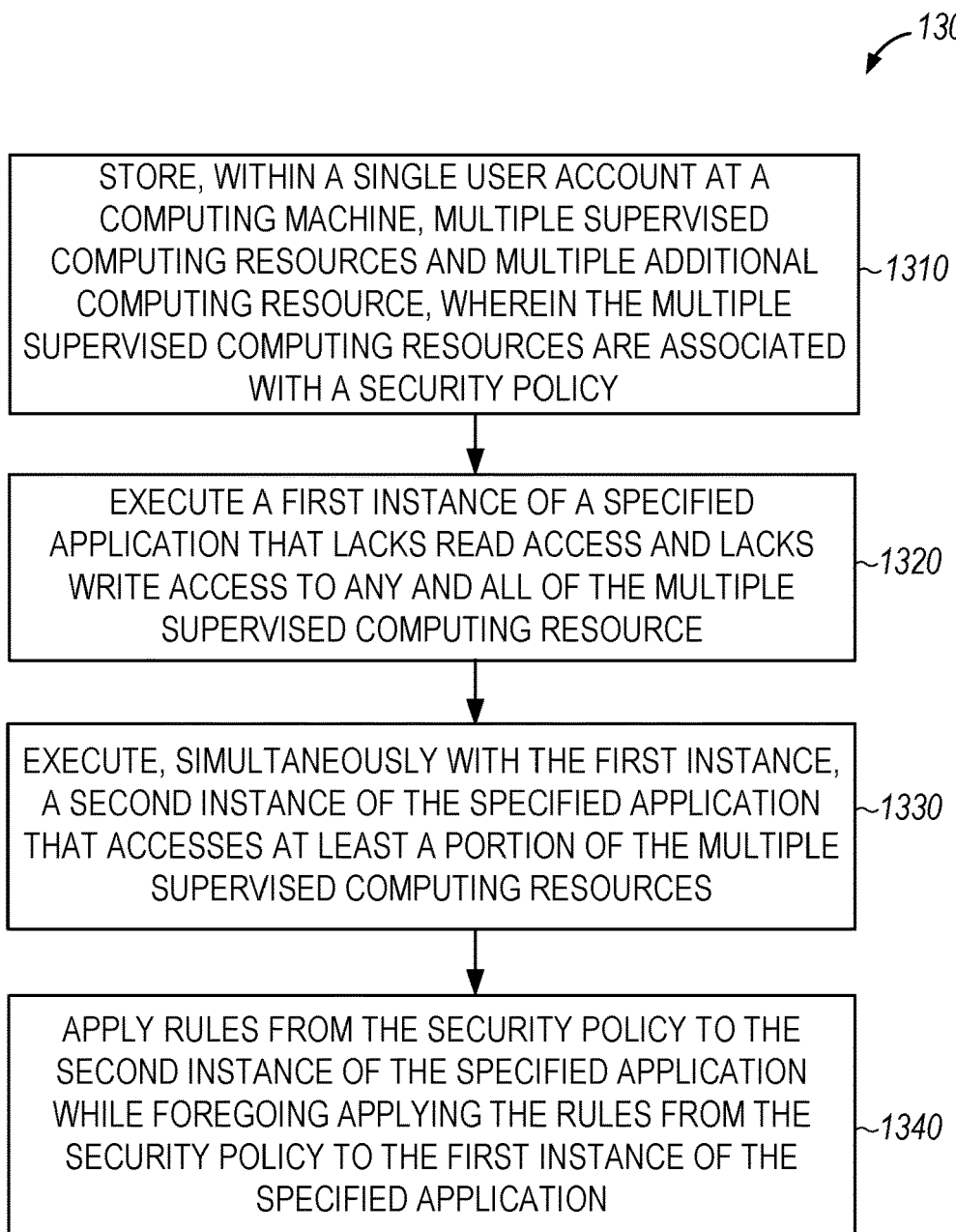
FIG. 13 is a flowchart of an example process associated with applying a security policy to a portion of running instances of an application, in accordance with some embodiments.

FIG. 13 is a flowchart of an example process 1300 associated with applying a security policy to a portion of running instances of an application. In some implementations, one or more process blocks of FIG. 13 may be performed by a computing machine (e.g., computing machine 100). In some implementations, one or more process blocks of FIG. 13 may be performed by another device or a group of devices separate from or including the computing machine. Additionally, or alternatively, one or more process blocks of FIG. 13 may be performed by one or more components of the computing machine 100, such as processor 102, main memory 104, static memory 106, network interface device 120, video display 110, alpha-numeric input device 112, UI navigation device 112, drive unit 116, signal generation device 118, and output controller 128.

As shown in FIG. 13, process 1300 may include storing, within a single user account at a computing machine, multiple supervised computing resources and multiple additional computing resources, wherein the multiple supervised computing resources are associated with a security policy (block 1310). For example, the computing machine may store, within a single user account at a computing machine, multiple supervised computing resources and multiple additional computing resources, wherein the multiple supervised computing resources are associated with a security policy, as described above.

As further shown in FIG. 13, process 1300 may include executing a first instance of a specified application that lacks read access and lacks write access to any and all of the multiple supervised computing resources (block 1320). For example, the computing machine may execute a first instance of a specified application that lacks read access and lacks write access to any and all of the multiple supervised computing resources, as described above.

As further shown in FIG. 13, process 1300 may include executing, simultaneously with the first instance, a second instance of the specified application that accesses at least a portion of the multiple supervised computing resources (block 1330). For example, the computing machine may execute, simultaneously with the first instance, a second instance of the specified application that accesses at least a portion of the multiple supervised computing resources, as described above.

As further shown in FIG. 13, process 1300 may include applying rules from the security policy to the second instance of the specified application while foregoing applying the rules from the security policy to the first instance of the specified application (block 1340). For example, the computing machine may apply rules from the security policy to the second instance of the specified application while foregoing applying the rules from the security policy to the first instance of the specified application, as described above.

Process 1300 may include additional implementations, such as any single implementation or any combination of implementations described below and/or in connection with one or more other processes described elsewhere herein.

In a first implementation, process 1300 includes identifying a computing resource as a supervised computing resource based on one or more of a location of the computing resource in a directory or file system, a cloud storage location, a rule in the security policy, a process name or path, a uniform resource locator (URL) address, and whether the computing resource is launched from an application launcher associated with the multiple supervised computing resources.

In a second implementation, the additional computing resources comprise personal computing resources, wherein the supervised computing resources comprise organizational computing resources, wherein the multiple supervised computing resources and the multiple additional computing resources comprise files, cloud file storage access, applications or websites.

In a third implementation, the first instance of the specified application accesses least a portion of the multiple additional computing resources.

In a fourth implementation, the second instance of the specified application has read access and lacks write access to at least a portion of the multiple additional computing resources, wherein, when the second instance access the at least the portion of the multiple additional computing resources, application of the security policy is based on a setting associated with the computing machine.

In a fifth implementation, process 1300 includes accessing, using a third instance of the specified application, an unsecure computing resource, blocking access, by the third instance of the specified application, to any and all of the multiple supervised computing resources and any and all of the multiple additional computing resources.

In a sixth implementation, process 1300 includes identifying the unsecure computing resource based on the unsecure computing resource residing in a download memory region, a memory region associated with attachments for an email application, or a memory region associated with a web browser.

In a seventh implementation, the download memory region comprises a download folder, wherein the memory region associated with the web browser comprises the download folder, wherein the memory region associated with the attachments for the email application comprises an attachment folder.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
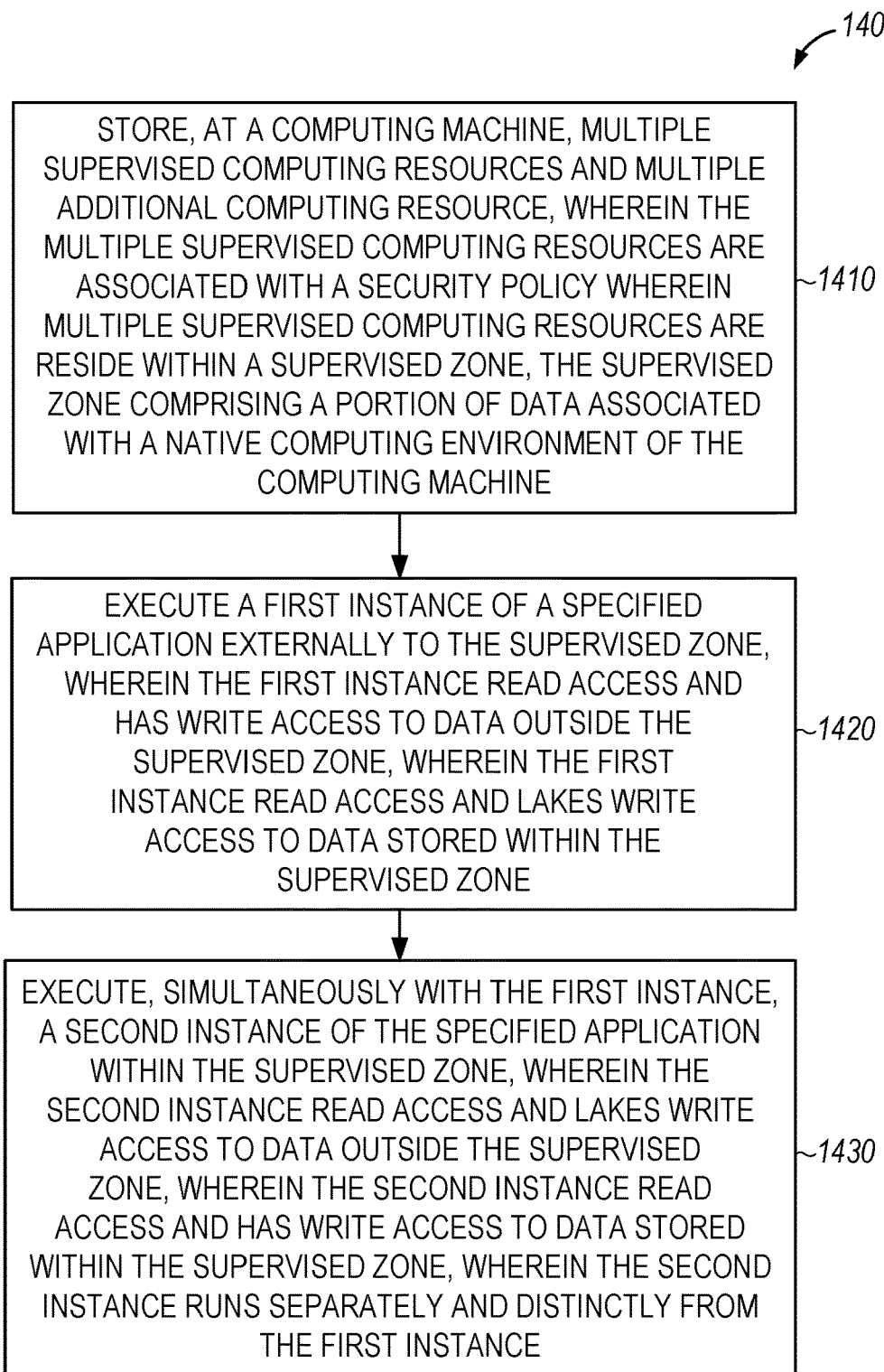
FIG. 14 is a flowchart of an example process associated with executing the same application in supervised and unsupervised zones, in accordance with some embodiments.

FIG. 14 is a flowchart of an example process 1400 associated with executing the same application in supervised and unsupervised zones. In some implementations, one or more process blocks of FIG. 14 may be performed by a computing machine (e.g., computing machine 100). In some implementations, one or more process blocks of FIG. 14 may be performed by another device or a group of devices separate from or including the computing machine. Additionally, or alternatively, one or more process blocks of FIG. 14 may be performed by one or more components of computing machine 100, such as processor 102, main memory 104, static memory 106, network interface device 120, video display 110, alpha-numeric input device 112, UI navigation device 112, drive unit 116, signal generation device 118, and output controller 128.

As shown in FIG. 14, process 1400 may include storing, at a computing machine (e.g., within a single user account), multiple supervised computing resources and multiple additional computing resources, wherein the multiple supervised computing resources are associated with a security policy, wherein the multiple supervised computing resources reside within a supervised zone, the supervised zone comprising a portion of data associated with a native computing environment of the computing machine (block 1410). For example, the computing machine may store, at a computing machine, multiple supervised computing resources and multiple additional computing resources, wherein the multiple supervised computing resources are associated with a security policy, wherein the multiple supervised computing resources reside within a supervised zone, the supervised zone comprising a portion of data associated with a native computing environment of the computing machine, as described above.

As further shown in FIG. 14, process 1400 may include executing a first instance of a specified application externally to the supervised zone, wherein the first instance has read access and has write access to data outside the supervised zone, wherein the first instance lacks read access and lacks write access to data stored within the supervised zone (block 1420). For example, the computing machine may execute a first instance of a specified application externally to the supervised zone, wherein the first instance has read access and has write access to data outside the supervised zone, wherein the first instance lacks read access and lacks write access to data stored within the supervised zone, as described above.

As further shown in FIG. 14, process 1400 may include executing, simultaneously with the first instance, a second instance of the specified application within the supervised zone, wherein the second instance has read access and lacks write access to data outside the supervised zone, wherein the second instance has read access and has write access to data stored within the supervised zone, wherein the second instance runs separately and distinctly from the first instance (block 1430). For example, the computing machine may execute, simultaneously with the first instance, a second instance of the specified application within the supervised zone, wherein the second instance has read access and lacks write access to data outside the supervised zone, wherein the second instance has read access and has write access to data stored within the supervised zone, wherein the second instance runs separately and distinctly from the first instance, as described above.

Process 1400 may include additional implementations, such as any single implementation or any combination of implementations described below and/or in connection with one or more other processes described elsewhere herein.

In a first implementation, the additional computing resources comprise personal computing resources, wherein the supervised computing resources comprise organizational computing resources, wherein the multiple supervised computing resources and the multiple additional computing resources comprise files, cloud file storage access, applications or websites.

In a second implementation, process 1400 includes the second instance of the specified application accesses a network via a supervised network interface, the security policy specifying networks or subnets accessible via the supervised network interface, and the supervised network interface isolates domain name system (DNS) traffic associated with the supervised zone.

In a third implementation, process 1400 includes the first instance of the specified application accesses the network via a native network interface of the computing machine and not via the supervised network interface, and the supervised network interface restricts the multiple additional resources, residing externally to the supervised zone, from accessing network resources associated with the supervised zone.

In a fourth implementation, process 1400 includes the first instance of the specified application accesses a Component Object Model (COM) of the computing machine, and the second instance of the specified application accesses an emulated COM of the supervised zone that is different from the COM of the computing machine. The COM may be a Distributed Component Object Model (DCOM).

In a fifth implementation, process 1400 includes the first instance of the specified application accesses, for interprocess communication, a remote procedure call (RPC) subsystem of the computing machine, and the second instance of the specified application accesses, for interprocess communication, an emulated RPC subsystem of the supervised zone that is different from the RPC subsystem of the computing machine.

In some implementations, the first instance of the specified application accesses common app platform application programming interfaces (APIs) available to universal applications (e.g., Universal Windows Platform (UWP) developed by Microsoft Corporation of Redmond, Washington) of the computing machine. The second instance of the specified application accesses common app platform APIs of the supervised zone that is different from the common app platform APIs available to universal applications of the computing machine. The common app platform APIs may comprise at least one of: shell infrastructure host service (e.g., Shell Infrastructure Host (Sihost)®), repository service (e.g., State Repository Service®), background task infrastructure service (e.g., Background Task Infrastructure®), user management service (e.g., User Manager Service®), directory authentication broker service (e.g., Azure Active Directory (AAD) Broker®), and directory credentials manager service (e.g., AAD Credentials Manager®). The background task infrastructure service comprises a host activity manager service (e.g., Host Activity Manager®). The user management service (e.g., User Manager Service®) comprises an application activation manager service (e.g., Application Activation Manager®) and a view manager service (e.g., View Manager®).

In a sixth implementation, process 1400 includes the computing machine stores, externally to the supervised zone, a set of global objects, the computing machine stores, within the supervised zone, an emulated set of global objects emulating the set of global objects, the first instance of the specified application accesses the set of global objects, and the second instance of the specified application accesses the emulated set of global objects.

In a seventh implementation, process 1400 includes the computing machine stores, externally to the supervised zone, a computing machine registry representing settings comprising of hardware device configurations, installed application settings, and operating system settings, the computing machine stores, within the supervised zone, an emulated registry emulating the computing machine registry for applications executing within the supervised zone, the first instance of the specified application accesses the computing machine registry, and the second instance of the specified application accesses the emulated registry.

In an eighth implementation, process 1400 includes the specified application is a file manager application, the first instance is for access to files from the multiple additional computing resources, and the second instance is for access to files from the multiple supervised computing resources and read-only access to the multiple additional computing resources. The second instance being for access to files from the multiple supervised computing resources and read-only access to the multiple additional computing resources may be based on the security policy.

In a ninth implementation, process 1400 includes accessing, via a file explorer of the computing machine, a request to open a selected file, wherein the file explorer executes externally to the supervised zone, wherein the file has an associated application, wherein the file explorer provides access to both files external to the supervised zone and files internal to the supervised zone, determining whether the selected file is from among the multiple supervised computing resources, upon determining that the selected file is from among the multiple supervised computing resources opening the selected file using an instance of the associated application executing within with the supervised zone, and upon determining that the selected file is not from among the multiple supervised computing resources opening the selected file using an instance of the associated application not executing within the supervised zone.

In a tenth implementation, an operating system of the computing machine lacks access to the multiple supervised computing resources from outside the supervised zone.

In an eleventh implementation, a security program is able to access both the supervised zone and the unsupervised zone, wherein the security program comprises one or more of an antivirus program, an anti-malware program or a security auditing tool. In some cases, the computing machine identifies a program as the security program based on a data structure (e.g., in a database, another data repository, or the memory of the computing machine) storing known security programs and based on a digital signature associated with the program. In response to the digital signature being associated with one of the known security programs in the data structure, an application associated with the security program transmits, to a driver of the computing machine, a message indicating that the program is to be able to access both the supervised zone and the unsupervised zone. The data structure may be dynamically updated based on known security programs, as new security programs may appear after the security policy is first implemented at the computing machine.

In a twelfth implementation, process 1400 includes accessing, using a restricted instance of the specified application executing in a restricted zone, an unsecure computing resource, blocking access, by the restricted instance of the specified application, to any and all of the multiple supervised computing resources and any and all of the multiple additional computing resources. The restricted zone may be used for computing resources (e.g., files, cloud file storage access, applications or websites) that are downloaded from the Internet or received as email messages and are not known to be secure. The restricted zone may restrict access, by computing resources in the restricted zone, to certain software or hardware of the computing machine. Upon verification that a computing resource is safe, the user may be able to move the computing resource from the restricted zone into the unsupervised zone.

In a thirteenth implementation, a security program is able to access the supervised zone, the unsupervised zone, and the restricted zone, wherein the security program comprises one or more of an antivirus program, an anti-malware program or a security auditing tool.

In a fourteenth implementation, process 1400 includes identifying the unsecure computing resource based on the unsecure computing resource residing in a download memory region, a memory region associated with attachments for an email application, or a memory region associated with a web browser.

In a fifteenth implementation, the download memory region comprises a download folder, wherein the memory region associated with the web browser comprises the download folder, wherein the memory region associated with the attachments for the email application comprises an attachment folder.

In a sixteenth implementation, the computing machine opens, via the second instance, an additional application or website different from the specified application. The computing machine executes the additional application or website within the supervised zone. The additional application or website has read access and lacks write access to data outside the supervised zone. The additional application or website has read access and has write access to data stored within the supervised zone.

In a seventeenth implementation, the computing machine opens, via the first instance, additional application or website different from the specified application. The computing machine executes the additional application or website externally to the supervised zone. The additional application or website lacks read access and lacks write access to data stored within the supervised zone.

In one example use case, a user launches a spreadsheet application in the supervised zone to view a business budget. The user also launches the same spreadsheet application externally to the supervised zone to view a personal ancestry table. Two separate and distinct instances of the spreadsheet application are opened—one inside the supervised zone and one outside the supervised zone. The business budget includes hyperlinks for purchasing products for suppliers. When the user selects one of the hyperlinks for purchasing the products from the suppliers, the computing machine opens the hyperlinks within the supervised zone within a default web browser for the supervised zone. The personal ancestry table includes hyperlinks for social media websites of the user's relatives. When the user selects a hyperlink for a social media website, the social media page is opened within a default web browser for the unsupervised zone. The supervised zone and the unsupervised zone may have different default web browsers.

Alternatively, the supervised zone and the unsupervised zone may have the same default web browser. If the supervised zone and the unsupervised zone may have the same default web browser, two different windows of the web browser may be opened. One window (with the website for purchasing the product from the supplier) may operate within the supervised zone and one window (with the social media page) may operate within the unsupervised zone. The window with the website for purchasing the product from the supplier may have a stored version of a business credit card (stored within the supervised zone, in a wallet application or within the web browser), which can be used to purchase the product. However, the window with the social media website may lack the stored version of the business credit card, so that the user does not accidentally use the business credit card for a personal purchase order placed within the unsupervised zone.

Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
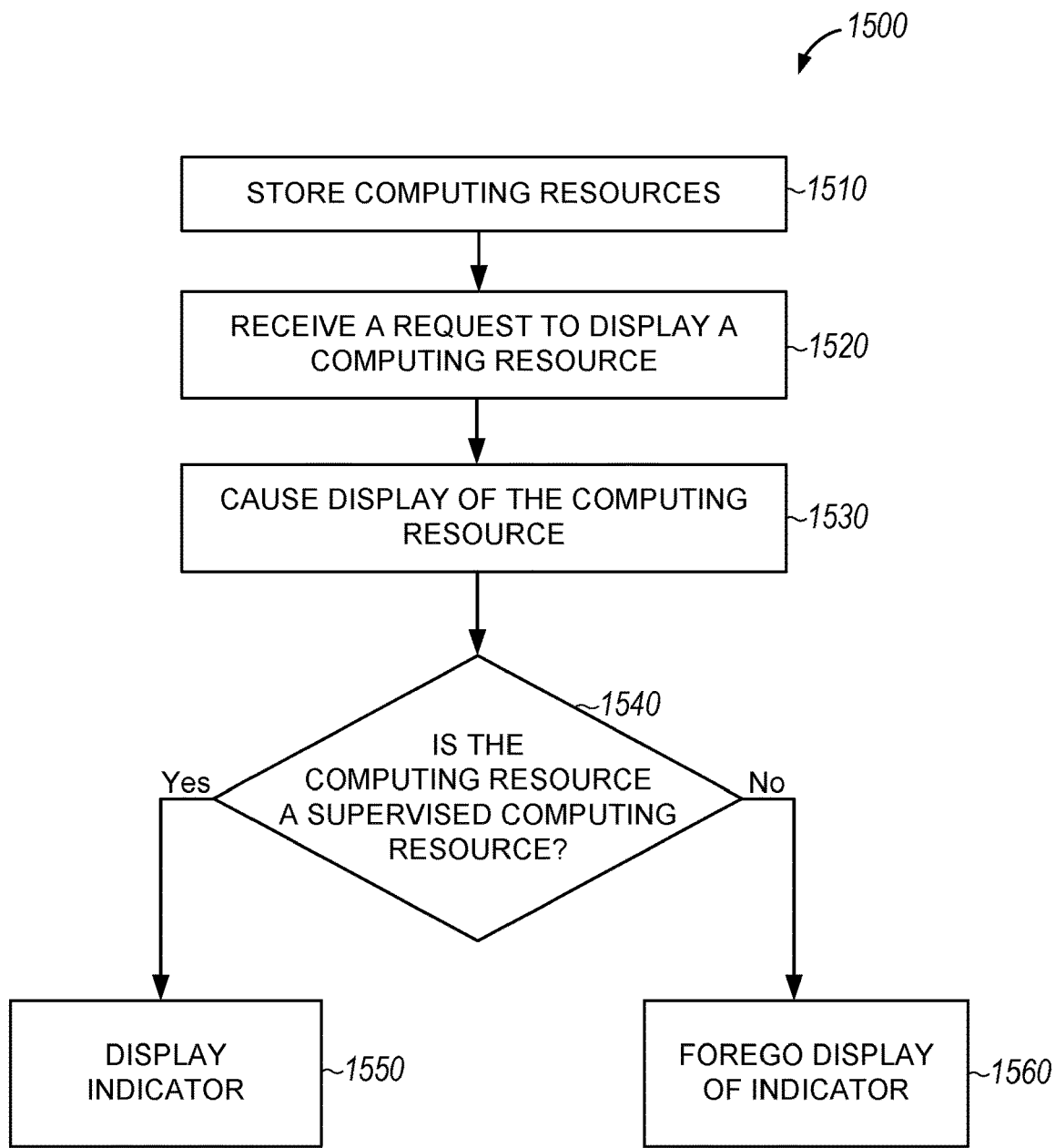
FIG. 15 is a flowchart of an example process associated with displaying an organizational indicator for an organizational computing resource, in accordance with some embodiments.

FIG. 15 is a flowchart of an example process 1500 associated with displaying an organizational indicator for an organizational computing resource, in accordance with some embodiments. In some implementations, one or more process blocks of FIG. 15 may be performed by a computing machine (e.g., computing machine 100). In some implementations, one or more process blocks of FIG. 15 may be performed by another device or a group of devices separate from or including the computing machine. Additionally, or alternatively, one or more process blocks of FIG. 15 may be performed by one or more components of computing machine 100, such as processor 102, main memory 104, static memory 106, network interface device 120, video display 110, alpha-numeric input device 112, UI navigation device 112, drive unit 116, signal generation device 118, and output controller 128.

At block 1510, the computing machine stores, in a memory (e.g., a local memory) of the computing machine, computing resources including supervised computing resources (e.g., organizational or business computing resources). The computing machine may store both supervised computing resources (e.g., business files or business software) and unsupervised computing resources (e.g., non-organizational or non-business computing resources, such as personal files or personal software). In some examples, the memory of the computing machine stores the supervised computing resources and unsupervised computing resources. In some cases, the supervised computing resources and the unsupervised computing resources are mutually exclusive.

At block 1520, the computing machine receives a request to display a computing resource from the computing resources stored in the memory. For example, a user may request, via a graphical user interface of the computing machine, to open a file for viewing (and, in some cases, editing).

At block 1530, the computing machine causes display of the computing resource within a display region of a display device. The display region may include all or a part of the display device. The display region may include all or a portion of the display space on the display device. The display region may include a window in some Windows® operating systems developed by Microsoft Corporation of Redmond, Washington or a similar display region in another operating system.

At block 1540, the computing machine determines whether the computing resource is a supervised computing resource based on identification criteria (e.g., organizational identification criteria or business identification criteria). The identification criteria may include at least one of: the computing resource residing in a directory in a filesystem of the computing machine or of a cloud storage unit, a file type of the computing resource, an application associated with the computing resource, a website associated with the computing resource, or the computing resource having been provided to or installed at the computing machine by a specified entity (e.g., an entity associated with an organization or a business). The identification criteria may include presence of the computing resource within a predefined zone of the memory (e.g., an organizational zone or a business zone of the memory). The predefined zone has at least one security policy that is applicable to the computing resources within the predefined zone and not applicable to the computing resources external to the predefined zone. In some cases, the predefined zone has at least one network interface that is accessible to the computing resources within the predefined zone and not accessible to the computing resources external to the predefined zone. In some implementations, the identification criteria include a computing resource being accessed via a supervised launcher (e.g., an organizational launcher or a business launcher) at the computing machine or including data from an additional supervised computing resource. The additional supervised computing resource may include at least one of: a file, an email, a Software as a Service (SaaS) application or website, or a network destination or subnet. As used herein, the term "subnet" encompasses its plain and ordinary meaning. A subnet may include a subnetwork that is a component of another network.

If the computing resource is the supervised computing resource, the process 1500 continues to block 1550. If the computing resource is not the supervised resource, the process 1500 continues to block 1560.

At block 1550, upon determining that the computing resource is the supervised computing resource, the computing machine causes display of an indicator (e.g., an organizational indicator or a business indicator) adjacent to an edge of the display region. The indicator indicates that the computing resource is the supervised computing resource. The indicator may include a border (e.g., the border 406A, 406B) occupying pixels external to the display region with a distance less than or equal to n pixels from the display region, where n is a positive integer, and where the border has a predefined color or design. The indicator may include a badge (e.g., the badge 408A, 408B) having a circular or elliptical shape overlaying a portion of the edge of the display region. After block 1550, the process 1500 ends.

At block 1560, upon determining that the computing resource is not the supervised computing resource, the computing machine foregoes causing display of the supervised indicator. After block 1560, the process 1500 ends.

Some embodiments are described as numbered examples (Example 1, 2, 3, etc.). These are provided as examples only and do not limit the technology disclosed herein.

Example 1 is a method comprising: storing, at a computing machine, multiple supervised computing resources and multiple additional computing resources, wherein the multiple supervised computing resources are associated with a security policy; causing, via a native computing environment of the computing machine, a display unit coupled with the computing machine to display simultaneously, all or a portion of a specified supervised computing resource and all or a portion of a specified additional computing resource; applying security rules from the security policy to the specified supervised computing resource, wherein applying the security rules comprises at least facilitating tracking, by a tracking service, activity of the computing machine with respect to the specified supervised computing resource; and forgoing facilitating tracking, by the tracking service, activity of the computing machine with respect to the specified additional computing resource and with respect to activity on the computing machine that is not associated with one or more of the multiple supervised computing resources.

In Example 2, the subject matter of Example 1 includes, wherein the additional computing resources comprise personal computing resources, wherein the supervised computing resources comprise business computing resources, wherein the multiple supervised computing resources and the multiple additional computing resources comprise files, cloud file storage access, applications or websites.

In Example 3, the subject matter of Examples 1-2 includes, foregoing applying security rules from the security policy to the specified additional computing resource.

In Example 4, the subject matter of Examples 1-3 includes, displaying, in association with the specified supervised computing resource, a visual indicator indicating that tracking is ongoing.

In Example 5, the subject matter of Example 4 includes, wherein the visual indicator comprises a badge or a border adjacent to a region of the display unit occupied by the specified supervised computing resource, wherein the visual indicator is established upon launch of the supervised computing resource, wherein the visual indicator is removed upon exit from the supervised computing resource or a log out by a user of the computing machine.

In Example 6, the subject matter of Examples 1-5 includes, wherein the activity of the computing machine with respect to the specified supervised computing resource and the activity of the computing machine with respect to the specified additional computing resource comprise network traffic.

In Example 7, the subject matter of Examples 1-6 includes, wherein the activity of the computing machine with respect to the specified supervised computing resource and the activity of the computing machine with respect to the specified additional computing resource comprise internet browsing.

In Example 8, the subject matter of Examples 1-7 includes, wherein the activity of the computing machine with respect to the specified supervised computing resource and the activity of the computing machine with respect to the specified additional computing resource comprise camera or microphone input activity.

In Example 9, the subject matter of Examples 1-8 includes, storing information transmitted from the computing machine to the tracking service; and providing for display, in response to a user request, of a visual representation of the information transmitted from the computing machine to the tracking service.

In Example 10, the subject matter of Examples 1-9 includes, wherein the tracking service comprises one or more of: a cloud-based tracking service, one or more servers, and an administrator computing device associated with the security policy.

Example 11 is a method comprising: storing, at a computing machine, multiple supervised computing resources and multiple additional computing resources, wherein the multiple supervised computing resources are associated with a security policy; causing, via a native computing environment of the computing machine, a display unit coupled with the computing machine to display, at a first display position, all or a portion of a specified supervised computing resource from among the multiple supervised computing resources; causing the display unit to display, at a display position calculated based on the first display position, a visual indicator that the specified supervised computing resource is associated with the security policy; and applying security rules from the security policy to the specified supervised computing resource.

In Example 12, the subject matter of Example 11 includes, wherein the additional computing resources comprise personal computing resources, wherein the supervised computing resources comprise business computing resources, wherein the multiple supervised computing resources and the multiple additional computing resources comprise files, cloud file storage access, applications or websites.

In Example 13, the subject matter of Examples 11-12 includes, wherein the additional computing resources comprise computing resources of a first type, wherein the supervised computing resources comprise computing resources of a second type for which an entity desires enhanced security, wherein the multiple supervised computing resources and the multiple additional computing resources comprise files, cloud file storage access, applications or websites.

In Example 14, the subject matter of Examples 11-13 includes, wherein the visual indicator comprises a badge proximate to an edge of the first display position, the badge indicating that the security policy is applicable to the specified supervised computing resource.

In Example 15, the subject matter of Example 14 includes, receiving a signal representing a user selection of the badge; and causing, in response to the user selection of the badge, the display unit to display information about the security policy applicable to the computing machine.

In Example 16, the subject matter of Examples 11-15 includes, wherein the visual indicator comprises a border, wherein the border comprises pixels that are: external to the first display position, within a threshold distance from an edge of the first display position, and not occupied by a badge associated with the visual indicator.

In Example 17, the subject matter of Example 16 includes, wherein multiple computing resources are displayed on the display unit, wherein each displayed computing resource is associated with a display priority value based on a time when the displayed computing resource was last selected, wherein the border comprises pixels that are not occupied by a computing resource that was selected after a last selection time of the specified supervised computing resource.

In Example 18, the subject matter of Examples 16-17 includes, receiving, at processing circuitry of the computing machine, a signal representing dragging the specified supervised computing resource along the display unit; recalculating, using the processing circuitry, a position of the border in a discrete manner once every n milliseconds or based on operating system window events, wherein n is a predetermined positive number.

In Example 19, the subject matter of Examples 16-18 includes, generating a pop-up or an on-display alert by the specified supervised computing resource; and causing display of the border around the pop-up or the on-display alert.

In Example 20, the subject matter of Examples 11-19 includes, receiving, at the computing machine, a user request to perform an action that violates a security rule; and permitting, based on a setting stored in conjunction with the security policy and provided by an administrator of the security policy, the user to perform the action that violates the security rule in response to an additional affirmative act by the user confirming that the user wishes to perform the action.

In Example 21, the subject matter of Examples 11-20 includes, causing, via the native computing environment of the computing machine, the display unit to display, at a second display position, all or a portion of a specified additional computing resource from among the multiple additional computing resources; foregoing causing the display unit to display, in association with the specified additional computing resource, the visual indicator; and foregoing applying security rules from the security policy to the specified additional computing resource.

In Example 22, the subject matter of Examples 11-21 includes, causing, via a native computing environment of the computing machine, the display unit coupled with the computing machine to display, at a predefined display position, indicia of multiple computing resources open on the computing device, wherein indicia of supervised computing resources are coupled with a visual symbol indicating that the supervised computing resources are associated with the security policy.

In Example 23, the subject matter of Example 22 includes, wherein indicia of additional computing resources are not coupled with the visual symbol.

In Example 24, the subject matter of Examples 22-23 includes, wherein the displayed indicia of the multiple computing resources comprise a task bar or a dock.

Example 25 is a method comprising: storing, within a single user account at a computing machine, multiple unsupervised computing resources and multiple supervised computing resources, wherein the multiple supervised computing resources are associated with a security policy; receiving, from a user of the computing machine, a request to access a specified supervised computing resource from among the multiple supervised computing resources; providing access to the specified supervised computing resource locally on the computing machine and directly through a native computing environment of the computing machine; causing a display unit to display, at a display position related to a region of the display unit displaying the specified supervised computing resource, an indicator that the specified supervised computing resource is associated with the security policy; and applying security rules from the security policy to the specified supervised computing resource.

In Example 26, the subject matter of Example 25 includes, receiving, from the user of the computing machine, a request to access a specified unsupervised computing resource from among the multiple unsupervised computing resources; providing access to the specified unsupervised computing resource locally on the computing machine and directly through a native computing environment of the computing machine; forgoing causing the display unit to display the indicator that the specified unsupervised computing resource is associated with the security policy; and foregoing applying security rules from the security policy to the specified personal computing resource.

In Example 27, the subject matter of Examples 25-26 includes, wherein the multiple unsupervised computing resources are not associated with the security policy.

In Example 28, the subject matter of Examples 25-27 includes, wherein an administrator computing device, external to the computing machine, has access to the multiple supervised computing resources residing at the computing machine and lacks access to the multiple unsupervised computing resources residing at the computing machine.

In Example 29, the subject matter of Examples 25-28 includes, wherein the security policy comprises the security rules restricting activity of the user of the computing machine with respect to the multiple supervised computing resources.

In Example 30, the subject matter of Examples 25-29 includes, wherein the security policy comprises a monitoring policy allowing a remote computing device to monitor activity of the user of the computing machine with respect to the multiple supervised computing resources.

In Example 31, the subject matter of Examples 25-30 includes, wherein the multiple unsupervised computing resources and the multiple supervised computing resources reside in separate and distinct directories of a filesystem of the computing machine or of a cloud storage unit.

Example 32 is a method comprising: receiving, via a user account at a computing machine, a request to access a computing resource residing on the computing machine; providing access to the computing resource locally on the computing machine and directly through a native computing environment of the computing machine; determining that the computing resource is associated with a security policy, wherein the user account at the computing machine is associated with multiple computing resources, including the computing resource, residing on the computing machine, a first portion of the multiple computing resources being associated with the security policy and a second portion of the multiple computing resources not being associated with the security policy; causing, in response to determining that the computing resource is associated with the security policy, a display unit to display, in association with a region of the display unit displaying the computing resource, a visual indication that the computing resource is associated with the security policy; and applying security rules from the security policy to the computing resource.

In Example 33, the subject matter of Example 32 includes, wherein the computing resource is a website, an application or a file, wherein the computing machine is one of: a laptop computer, a desktop computer, a mobile phone or a tablet computer.

In Example 34, the subject matter of Examples 32-33 includes, wherein the security policy is an organizational security policy, wherein the computing machine stores an organizational set of computing resources associated with the organizational security policy and a personal set of computing resources not associated with the organizational security policy.

In Example 35, the subject matter of Examples 32-34 includes, wherein the security rules from the security policy comprise one or more of: blocking sharing of the computing resource, logging a reason for sharing of the computing resource, receiving a user confirmation before sharing of the computing resource, logging keystrokes while the computing resource is selected, and locking the computing resource in response to the computing machine being idle for at least a threshold time period.

In Example 36, the subject matter of Example 35 includes, wherein sharing comprises one or more of printing, screensharing, transmitting via email or a messaging service, dragging and dropping, cutting and pasting, downloading, uploading, attaching, printing, accessing a specific website, accessing a category of websites, launching an application or taking a screenshot.

In Example 37, the subject matter of Examples 32-36 includes, deactivating one or more security rules from the security policy with respect to a computing resource in response to a user request; and logging a reason for the user request.

In Example 38, the subject matter of Examples 32-37 includes, receiving, via a graphical user interface (GUI), an indication of a selection of the visual indication; and providing for display, in response to the selection of the visual indication, information regarding permissions of a user of the computing machine with respect to the computing resource or information regarding the security policy.

In Example 39, the subject matter of Examples 32-38 includes, causing the display unit to simultaneously display the computing resource associated with the security policy and an additional computing resource not associated with the security policy, both the computing resource and the additional computing resource executing through the native computing environment of the computing machine.

In Example 40, the subject matter of Examples 32-39 includes, wherein the visual indicator is displayed on or adjacent to a boundary of the region of the display unit displaying the computing resource.

Example 41 is a method comprising: storing, within a single user account at a computing machine, multiple supervised computing resources and multiple additional computing resources, wherein the multiple supervised computing resources are associated with a security policy; executing a first instance of a specified application that lacks read access and lacks write access to any and all of the multiple supervised computing resources; executing, simultaneously with the first instance, a second instance of the specified application that accesses at least a portion of the multiple supervised computing resources; and applying rules from the security policy to the second instance of the specified application while foregoing applying the rules from the security policy to the first instance of the specified application.

In Example 42, the subject matter of Example 41 includes, identifying a computing resource as a supervised computing resource based on one or more of: a location of the computing resource in a directory or file system, a cloud storage location, a rule in the security policy, a process name or path, a uniform resource locator (URL) address, and whether the computing resource is launched from an application launcher associated with the multiple supervised computing resources.

In Example 43, the subject matter of Examples 41-42 includes, wherein the additional computing resources comprise personal computing resources, wherein the supervised computing resources comprise organizational computing resources, wherein the multiple supervised computing resources and the multiple additional computing resources comprise files, cloud file storage access, applications or websites.

In Example 44, the subject matter of Examples 41-43 includes, wherein the first instance of the specified application accesses least a portion of the multiple additional computing resources.

In Example 45, the subject matter of Examples 41-44 includes, wherein the second instance of the specified application has read access and lacks write access to at least a portion of the multiple additional computing resources, wherein, when the second instance access the at least the portion of the multiple additional computing resources, application of the security policy is based on a setting associated with the computing machine.

In Example 46, the subject matter of Examples 41-45 includes, accessing, using a third instance of the specified application, an unsecure computing resource; blocking access, by the third instance of the specified application, to any and all of the multiple supervised computing resources and any and all of the multiple additional computing resources.

In Example 47, the subject matter of Example 46 includes, identifying the unsecure computing resource based on the unsecure computing resource residing in a download memory region, a memory region associated with attachments for an email application, or a memory region associated with a web browser.

In Example 48, the subject matter of Example 47 includes, wherein the download memory region comprises a download folder, wherein the memory region associated with the web browser comprises the download folder, wherein the memory region associated with the attachments for the email application comprises an attachment folder.

Example 49 is a method comprising: storing, at a computing machine, multiple supervised computing resources and multiple additional computing resources, wherein the multiple supervised computing resources are associated with a security policy, wherein the multiple supervised computing resources reside within a supervised zone, the supervised zone comprising a portion of data associated with a native computing environment of the computing machine; executing a first instance of a specified application externally to the supervised zone, wherein the first instance has read access and has write access to data outside the supervised zone, wherein the first instance lacks read access and lacks write access to data stored within the supervised zone; and executing, simultaneously with the first instance, a second instance of the specified application within the supervised zone, wherein the second instance has read access and lacks write access to data outside the supervised zone, wherein the second instance has read access and has write access to data stored within the supervised zone, wherein the second instance runs separately and distinctly from the first instance.

In Example 50, the subject matter of Example 49 includes, wherein the additional computing resources comprise personal computing resources, wherein the supervised computing resources comprise organizational computing resources, wherein the multiple supervised computing resources and the multiple additional computing resources comprise files, cloud file storage access, applications or websites.

In Example 51, the subject matter of Examples 49-50 includes, wherein: the second instance of the specified application accesses a network via a supervised network interface, and the supervised network interface isolates domain name system (DNS) traffic associated with the supervised zone.

In Example 52, the subject matter of Example 51 includes, wherein: the first instance of the specified application accesses the network via a native network interface of the computing machine and not via the supervised network interface, and the supervised network interface restricts the multiple additional resources, residing externally to the supervised zone, from accessing network resources associated with the supervised zone.

In Example 53, the subject matter of Examples 49-52 includes, wherein: the first instance of the specified application accesses a Component Object Model (COM) of the computing machine, and the second instance of the specified application accesses an emulated COM of the supervised zone that is different from the COM of the computing machine.

In Example 54, the subject matter of Examples 49-53 includes, wherein: the first instance of the specified application accesses, for interprocess communication, a remote procedure call (RPC) subsystem of the computing machine, and the second instance of the specified application accesses, for interprocess communication, an emulated RPC subsystem of the supervised zone that is different from the RPC subsystem of the computing machine.

In Example 55, the subject matter of Examples 49-54 includes, wherein: the computing machine stores, externally to the supervised zone, a set of global objects, the computing machine stores, within the supervised zone, an emulated set of global objects emulating the set of global objects, the first instance of the specified application accesses the set of global objects, and the second instance of the specified application accesses the emulated set of global objects.

In Example 56, the subject matter of Examples 49-55 includes, wherein: the computing machine stores, externally to the supervised zone, a computing machine registry representing settings comprising of hardware device configurations, installed application settings, and operating system settings, the computing machine stores, within the supervised zone, an emulated registry emulating the computing machine registry for applications executing within the supervised zone, the first instance of the specified application accesses the computing machine registry, and the second instance of the specified application accesses the emulated registry.

In Example 57, the subject matter of Examples 49-56 includes, wherein: the specified application is a file manager application, the first instance is for access to files from the multiple additional computing resources, and the second instance is for access to files from the multiple supervised computing resources and read-only access to the multiple additional computing resources.

In Example 58, the subject matter of Examples 49-57 includes, accessing, via a file explorer of the computing machine, a request to open a selected file, wherein the file explorer executes externally to the supervised zone, wherein the file has an associated application, wherein the file explorer provides access to both files external to the supervised zone and files internal to the supervised zone; determining whether the selected file is from among the multiple supervised computing resources; upon determining that the selected file is from among the multiple supervised computing resources: opening the selected file using an instance of the associated application executing within with the supervised zone; and upon determining that the selected file is not from among the multiple supervised computing resources: opening the selected file using an instance of the associated application not executing within the supervised zone.

In Example 59, the subject matter of Examples 49-58 includes, wherein an operating system of the computing machine lacks access to the multiple supervised computing resources from outside the supervised zone.

In Example 60, the subject matter of Examples 49-59 includes, wherein a security program is able to access both the supervised zone and the unsupervised zone, wherein the security program comprises one or more of an antivirus program, an anti-malware program or a security auditing tool.

In Example 61, the subject matter of Examples 49-60 includes, accessing, using a restricted instance of the specified application executing in a restricted zone, an unsecure computing resource; blocking access, by the restricted instance of the specified application, to any and all of the multiple supervised computing resources and any and all of the multiple additional computing resources.

In Example 62, the subject matter of Example 61 includes, wherein a security program is able to access the supervised zone, the unsupervised zone, and the restricted zone, wherein the security program comprises one or more of an antivirus program, an anti-malware program or a security auditing tool.

In Example 63, the subject matter of Examples 61-62 includes, identifying the unsecure computing resource based on the unsecure computing resource residing in a download memory region, a memory region associated with attachments for an email application, or a memory region associated with a web browser.

In Example 64, the subject matter of Example 63 includes, wherein the download memory region comprises a download folder, wherein the memory region associated with the web browser comprises the download folder, wherein the memory region associated with the attachments for the email application comprises an attachment folder.

Example 65 is a method comprising: storing, in a memory of a computing machine, computing resources including supervised computing resources; receiving a request to display a computing resource from the computing resources stored in the memory; causing display of the computing resource within a display region of a display device; determining whether the computing resource is a supervised computing resource from the supervised computing resources based on identification criteria; and upon determining that the computing resource is the supervised computing resource: causing display of an indicator adjacent to an edge of the display region, wherein the indicator indicates that the computing resource is the supervised computing resource; or upon determining that the computing resource is not the supervised computing resource: foregoing causing display of the indicator.

In Example 66, the subject matter of Example 65 includes, wherein the identification criteria comprise at least one of: the computing resource residing in a directory in a filesystem of the computing machine or of a cloud storage unit, a file type of the computing resource, an application associated with the computing resource, a website associated with the computing resource, or the computing resource having been provided to or installed at the computing machine by a specified entity.

In Example 67, the subject matter of Examples 65-66 includes, wherein the identification criteria comprise presence of the computing resource within a predefined zone of the memory, wherein the predefined zone has at least one security policy that is applicable to the computing resources within the predefined organizational zone and not applicable to the computing resources external to the predefined organizational zone.

In Example 68, the subject matter of Examples 65-67 includes, wherein the identification criteria comprise presence of the computing resource within a predefined zone of the memory, wherein the predefined zone has at least one network interface that is accessible to the computing resources within the predefined zone and not accessible to the computing resources external to the predefined zone.

In Example 69, the subject matter of Examples 65-68 includes, wherein the identification criteria comprise a computing resource being accessed via a supervised launcher at the computing machine or including data from an additional supervised computing resource.

In Example 70, the subject matter of Example 69 includes, wherein the additional supervised computing resource comprises at least one of: a file, an email, a Software as a Service (SaaS) application or website, or a network destination or subnet.

In Example 71, the subject matter of Examples 65-70 includes, wherein the indicator comprises a border occupying pixels external to the display region with a distance less than or equal to n pixels from the display region, wherein n is a positive integer, wherein the border has a predefined color or design.

In Example 72, the subject matter of Examples 65-71 includes, wherein the indicator comprises a badge having a circular or elliptical shape overlaying a portion of the edge of the display region.

In Example 73, the subject matter of Examples 65-72 includes, wherein the memory of the computing machine stores the supervised computing resources and unsupervised computing resources, wherein the supervised computing resources and the unsupervised computing resources are mutually exclusive.

In Example 74, the subject matter of Examples 65-73 includes, wherein the display region comprises a portion of display space on the display device.

Example 75 is at least one machine-readable medium including instructions that, when executed by processing circuitry, cause the processing circuitry to perform operations to implement of any of Examples 1-74.

Example 76 is an apparatus comprising means to implement of any of Examples 1-74.

Example 77 is a system to implement of any of Examples 1-74.

Example 78 is a method to implement of any of Examples 1-74.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving, via a user account at a computing machine, a request to access a specified computing resource residing on the computing machine, wherein the specified computing resource is a website, an application or a file;
    providing access to the specified computing resource locally on the computing machine and directly through a native computing environment of the computing machine;
    determining that the specified computing resource is associated with a security policy, wherein the user account at the computing machine is associated with multiple computing resources residing on the computing machine, a first subset of the multiple computing resources being associated with the security policy and a second subset of the multiple computing resources not being associated with the security policy, wherein the specified computing resource is a member of the first subset of the multiple computing resources;
    causing, in response to determining that the specified computing resource is associated with the security policy, a display unit to display, in association with a region of the display unit displaying a visual representation of the specified computing resource, a visual indication that the specified computing resource is associated with the security policy, the visual indication comprising a border for the region, the border occupying points outside the region that are within a distance of n or fewer pixels from the region unless those pixels are occupied by visual representations of other computing resources that are more dominant than the specified computing resource in a computing resource stack, wherein n is a positive integer; and
    applying security rules from the security policy to the specified computing resource, wherein the security policy causes tracking, by a tracking service, of use of the first subset of the multiple computing resources, while forgoing causing tracking, by the tracking service, of use of the second subset of the multiple computing resources, wherein the tracking service comprises a cloud-based tracking service that executes externally to the computing machine.

2. The method of claim 1, wherein the computing machine is one of: a laptop computer, a desktop computer, a mobile phone or a tablet computer.

3. The method of claim 1, wherein the security policy is an organizational security policy, wherein the computing machine stores an organizational set of computing resources associated with the organizational security policy and a personal set of computing resources not associated with the organizational security policy.

4. The method of claim 1, wherein the security rules from the security policy comprise one or more of: blocking sharing of the specified computing resource, logging a reason for sharing of the specified computing resource, receiving a user confirmation before sharing of the specified computing resource, logging keystrokes while the specified computing resource is selected, and locking the specified computing resource in response to the computing machine being idle for at least a threshold time period.

5. The method of claim 4, wherein sharing comprises one or more of printing, screensharing, transmitting via email or a messaging service, dragging and dropping, cutting and pasting, downloading, uploading, attaching, accessing a specific website, accessing a category of websites, launching an application or taking a screenshot.

6. The method of claim 1, further comprising:
deactivating one or more security rules from the security policy with respect to the specified computing resource in response to a user request; and
logging a reason for the user request.

7. The method of claim 1, further comprising:
receiving, via a graphical user interface (GUI), an indication of a selection of the visual indication; and
providing for display, in response to the selection of the visual indication, information regarding permissions of a user of the computing machine with respect to the specified computing resource or information regarding the security policy.

8. The method of claim 1, further comprising:
causing the display unit to simultaneously display the specified computing resource associated with the security policy and an additional computing resource not associated with the security policy, both the specified computing resource and the additional computing resource executing through the native computing environment of the computing machine.

9. The method of claim 1, wherein the visual indication is displayed on or adjacent to a boundary of the region of the display unit displaying the specified computing resource.

10. The method of claim 1, wherein the second subset of the multiple computing resources accesses first common app platform application programming interfaces available to applications of the computing machine that use at least one of registry, remote procedure call, global objects, component object model, or universal application programming interfaces, wherein the first subset of the multiple computing resources accesses second common app platform application programming interfaces associated with the security policy that is different from the first common app platform application programming interfaces.

11. The method of claim 10, wherein the first common app platform application programming interfaces comprise a universal platform.

12. The method of claim 10, wherein the first common app platform application programming interfaces comprise at least one of a shell infrastructure host service, a repository service, a background task infrastructure service, a user management service, a directory authentication broker service, or a directory credentials manager service.

13. A non-transitory machine-readable medium storing instructions that, when executed by processing circuitry, cause the processing circuitry to perform operations comprising:
receiving, via a user account at a computing machine, a request to access a specified computing resource residing on the computing machine, wherein the specified computing resource is a website, an application or a file;
providing access to the specified computing resource locally on the computing machine and directly through a native computing environment of the computing machine;
determining that the specified computing resource is associated with a security policy, wherein the user account at the computing machine is associated with multiple computing resources residing on the computing machine, a first subset of the multiple computing resources being associated with the security policy and a second subset of the multiple computing resources not being associated with the security policy, wherein the specified computing resource is a member of the first subset of the multiple computing resources;
causing, in response to determining that the specified computing resource is associated with the security policy, a display unit to display, in association with a region of the display unit displaying a visual representation of the specified computing resource, a visual indication that the specified computing resource is associated with the security policy, the visual indication comprising a border for the region, the border occupying points outside the region that are within a distance of n or fewer pixels from the region unless those pixels are occupied by visual representations of other computing resources that are more dominant than the specified computing resource in a computing resource stack, wherein n is a positive integer; and
applying security rules from the security policy to the specified computing resource, wherein the security policy causes tracking, by a tracking service, of use of the first subset of the multiple computing resources, while forgoing causing tracking, by the tracking service, of use of the second subset of the multiple computing resources, wherein the tracking service comprises a cloud-based tracking service that executes externally to the computing machine.

14. The machine-readable medium of claim 13, wherein the computing machine is one of: a laptop computer, a desktop computer, a mobile phone or a tablet computer.

15. The machine-readable medium of claim 13, wherein the security policy is an organizational security policy, wherein the computing machine stores an organizational set of computing resources associated with the organizational security policy and a personal set of computing resources not associated with the organizational security policy.

16. The machine-readable medium of claim 13, wherein the security rules from the security policy comprise one or more of: blocking sharing of the specified computing resource, logging a reason for sharing of the specified computing resource, receiving a user confirmation before sharing of the specified computing resource, logging keystrokes while the specified computing resource is selected, and locking the specified computing resource in response to the computing machine being idle for at least a threshold time period.

17. The machine-readable medium of claim 16, wherein sharing comprises one or more of printing, screensharing, transmitting via email or a messaging service, dragging and dropping, cutting and pasting, downloading, uploading, attaching, accessing a specific website, accessing a category of websites, launching an application or taking a screenshot.

18. The machine-readable medium of claim 13, the operations further comprising:
deactivating one or more security rules from the security policy with respect to the specified computing resource in response to a user request; and
logging a reason for the user request.

19. The machine-readable medium of claim 13, the operations further comprising:
receiving, via a graphical user interface (GUI), an indication of a selection of the visual indication; and
providing for display, in response to the selection of the visual indication, information regarding permissions of a user of the computing machine with respect to the specified computing resource or information regarding the security policy.

20. The machine-readable medium of claim 13, the operations further comprising:

causing the display unit to simultaneously display the specified computing resource associated with the security policy and an additional computing resource not associated with the security policy, both the specified computing resource and the additional computing resource executing through the native computing environment of the computing machine.

21. The machine-readable medium of claim 13, wherein the visual indication is displayed on or adjacent to a boundary of the region of the display unit displaying the specified computing resource.

22. A system comprising:
processing circuitry; and
a memory storing instructions that, when executed by processing circuitry, cause the processing circuitry to perform operations comprising:
receiving, via a user account at a computing machine, a request to access a specified computing resource residing on the computing machine, wherein the specified computing resource is a website, an application or a file;
providing access to the specified computing resource locally on the computing machine and directly through a native computing environment of the computing machine;
determining that the specified computing resource is associated with a security policy, wherein the user account at the computing machine is associated with multiple computing resources residing on the computing machine, a first subset of the multiple computing resources being associated with the security policy and a second subset of the multiple computing resources not being associated with the security policy, wherein the specified computing resource is a member of the first subset of the multiple computing resources;
causing, in response to determining that the specified computing resource is associated with the security policy, a display unit to display, in association with a region of the display unit displaying a visual representation of the specified computing resource, a visual indication that the specified computing resource is associated with the security policy, the visual indication comprising a border for the region, the border occupying points outside the region that are within a distance of n or fewer pixels from the region unless those pixels are occupied by visual representations of other computing resources that are more dominant than the specified computing resource in a computing resource stack, wherein n is a positive integer; and
applying security rules from the security policy to the specified computing resource, wherein the security policy causes tracking, by a tracking service, of use of the first subset of the multiple computing resources, while forgoing causing tracking, by the tracking service, of use of the second subset of the multiple computing resources, wherein the tracking service comprises a cloud-based tracking service that executes externally to the computing machine.

23. The system of claim 22, wherein the computing machine is one of: a laptop computer, a desktop computer, a mobile phone or a tablet computer.

* * * * *